United States Patent
Arthur et al.

(10) Patent No.: US 12,093,911 B2
(45) Date of Patent: Sep. 17, 2024

(54) MARKETING MESSAGES IN MOBILE COMMERCE

(71) Applicant: First Data Corporation, Greenwood Village, CO (US)

(72) Inventors: Steven E. Arthur, Castle Rock, CO (US); Christopher L. Toomer, Parker, CO (US); Sarah Owen, Denver, CO (US); Theodore VanDeburg, Denver, CO (US)

(73) Assignee: FIRST DATA CORPORATION, Greenwood Village, CO (US)

( * ) Notice: Subject to any disclaimer, the term of this patent is extended or adjusted under 35 U.S.C. 154(b) by 1158 days.

(21) Appl. No.: 16/829,592

(22) Filed: Mar. 25, 2020

(65) Prior Publication Data

US 2020/0226568 A1 Jul. 16, 2020

Related U.S. Application Data

(63) Continuation of application No. 15/920,089, filed on Mar. 13, 2018, now abandoned, which is a
(Continued)

(51) Int. Cl.
*G06Q 20/20* (2012.01)
*G06Q 20/22* (2012.01)
(Continued)

(52) U.S. Cl.
CPC .......... *G06Q 20/20* (2013.01); *G06Q 20/227* (2013.01); *G06Q 20/322* (2013.01);
(Continued)

(58) Field of Classification Search
CPC .......................................... G06Q 10/00–90/00
See application file for complete search history.

(56) References Cited

U.S. PATENT DOCUMENTS

| 5,671,279 A | 9/1997 | Elgamal |
| 5,892,900 A | 4/1999 | Ginter et al. |

(Continued)

FOREIGN PATENT DOCUMENTS

| EP | 1467300 A1 | 10/2004 |
| WO | 2005/079254 A2 | 9/2005 |
| WO | 2008/103883 A1 | 8/2008 |

OTHER PUBLICATIONS

U.S. Appl. No. 11/830,409, "Final Office Action" mailed Nov. 26, 2014, 25 pages.
(Continued)

*Primary Examiner* — Arif Ullah
(74) *Attorney, Agent, or Firm* — FOLEY & LARDNER LLP

(57) ABSTRACT

A computer-implemented method of conducting wireless transaction includes receiving, using an antenna of a point of sale device, one or more electromagnetic signals from a mobile device of a customer. The electromagnetic signals are interpreted using a communications module of the point of sale device to determine information related to a financial account of the customer. Using a network interface of the point of sale device, a connection with an acquirer system is initiated. Using the network interface a packet of data including an authorization request is transmitted over the connection to the acquirer system. The packet of data includes the information related to the financial account, a merchant identifier, a date, and a transaction amount. An authorization code is received from the acquirer system using the network interface. An electronic receipt is transmitted to the mobile device using the network interface.

14 Claims, 19 Drawing Sheets

Related U.S. Application Data continuation of application No. 11/830,409, filed on Jul. 30, 2007, now abandoned.

(60) Provisional application No. 60/911,113, filed on Apr. 11, 2007, provisional application No. 60/891,106, filed on Feb. 22, 2007.

(51) Int. Cl.
*G06Q 20/32* (2012.01)
*G06Q 30/02* (2023.01)
*G07F 17/16* (2006.01)

(52) U.S. Cl.
CPC ....... *G06Q 20/3255* (2013.01); *G06Q 20/326* (2020.05); *G06Q 20/3278* (2013.01); *G06Q 30/02* (2013.01); *G07F 17/16* (2013.01)

(56) References Cited

U.S. PATENT DOCUMENTS

| | | | |
|---|---|---|---|
| 5,903,652 | A | 5/1999 | Mital |
| 5,903,721 | A | 5/1999 | Sixtus |
| 6,085,168 | A | 7/2000 | Mori et al. |
| 6,311,171 | B1 | 10/2001 | Dent |
| 6,327,578 | B1 | 12/2001 | Linehan |
| 6,547,132 | B1 | 4/2003 | Templeton et al. |
| 6,827,260 | B2 | 12/2004 | Stoutenburg et al. |
| 6,836,765 | B1 | 12/2004 | Sussman |
| 6,873,974 | B1 | 3/2005 | Schutzer |
| 6,886,742 | B2 | 5/2005 | Stoutenburg et al. |
| 6,931,382 | B2 | 8/2005 | Laage et al. |
| 6,935,561 | B2 | 8/2005 | Chernomorov |
| 7,062,258 | B1 | 6/2006 | Sini et al. |
| 7,086,584 | B2 | 8/2006 | Stoutenburg et al. |
| 7,088,995 | B2 | 8/2006 | Rao |
| 7,089,208 | B1 | 8/2006 | Levchin |
| 7,162,454 | B1 | 1/2007 | Donner et al. |
| 7,597,264 | B2 | 10/2009 | Newbrough et al. |
| 7,600,673 | B2 | 10/2009 | Stoutenburg et al. |
| 7,748,621 | B2 | 7/2010 | Gusler et al. |
| 8,073,772 | B2 | 12/2011 | Bishop et al. |
| 8,515,783 | B1 | 8/2013 | Weeks |
| 8,566,239 | B2 | 10/2013 | Arthur et al. |
| 10,102,518 | B2 | 10/2018 | Arthur et al. |
| 2002/0013765 | A1 | 1/2002 | Shwartz |
| 2002/0032616 | A1 | 3/2002 | Suzuki et al. |
| 2002/0052841 | A1 | 5/2002 | Guthrie et al. |
| 2002/0052842 | A1 | 5/2002 | Schuba et al. |
| 2002/0065774 | A1 | 5/2002 | Young et al. |
| 2002/0077974 | A1* | 6/2002 | Ortiz ............... G06Q 20/10 705/39 |
| 2002/0077986 | A1* | 6/2002 | Kobata ............ G06Q 10/107 705/52 |
| 2002/0107755 | A1 | 8/2002 | Steed et al. |
| 2002/0107791 | A1 | 8/2002 | Nobrega et al. |
| 2002/0152179 | A1 | 10/2002 | Racov |
| 2002/0178060 | A1 | 11/2002 | Sheehan |
| 2003/0028484 | A1 | 2/2003 | Boylan et al. |
| 2003/0110138 | A1 | 6/2003 | Van Do et al. |
| 2003/0200184 | A1 | 10/2003 | Dominguez et al. |
| 2004/0010462 | A1 | 1/2004 | Moon et al. |
| 2004/0019564 | A1 | 1/2004 | Goldthwaite et al. |
| 2004/0029569 | A1 | 2/2004 | Khan et al. |
| 2004/0176995 | A1 | 9/2004 | Fusz |
| 2004/0181448 | A1 | 9/2004 | Hartsman et al. |
| 2004/0230536 | A1 | 11/2004 | Fung et al. |
| 2004/0243496 | A1* | 12/2004 | Kim ................ G07F 7/1008 705/50 |
| 2005/0060437 | A1 | 3/2005 | Doyle et al. |
| 2005/0114508 | A1 | 5/2005 | Destefano |
| 2005/0131808 | A1 | 6/2005 | Villa |
| 2005/0177442 | A1 | 8/2005 | Sullivan et al. |
| 2005/0187873 | A1 | 8/2005 | Labrou et al. |
| 2005/0222906 | A1 | 10/2005 | Chen |
| 2005/0222961 | A1 | 10/2005 | Staib et al. |
| 2005/0240477 | A1 | 10/2005 | Friday et al. |
| 2005/0240522 | A1 | 10/2005 | Kranzley et al. |
| 2005/0256802 | A1 | 11/2005 | Ammermann et al. |
| 2006/0085357 | A1* | 4/2006 | Pizarro ............ G06Q 30/06 705/64 |
| 2006/0106699 | A1 | 5/2006 | Hitalenko et al. |
| 2006/0155874 | A1 | 7/2006 | Hunter |
| 2006/0165060 | A1 | 7/2006 | Dua |
| 2006/0178932 | A1 | 8/2006 | Lang |
| 2006/0206709 | A1 | 9/2006 | Labrou et al. |
| 2006/0212355 | A1 | 9/2006 | Teague et al. |
| 2006/0224470 | A1 | 10/2006 | Garcia Ruano et al. |
| 2006/0287004 | A1 | 12/2006 | Fuqua |
| 2006/0294025 | A1 | 12/2006 | Mengerink |
| 2007/0022058 | A1 | 1/2007 | Labrou et al. |
| 2007/0055597 | A1 | 3/2007 | Patel et al. |
| 2007/0094113 | A1 | 4/2007 | Chapeta |
| 2007/0095892 | A1 | 5/2007 | Lyons et al. |
| 2007/0198339 | A1 | 8/2007 | Shen et al. |
| 2007/0206507 | A1 | 9/2007 | Reichman et al. |
| 2007/0254712 | A1 | 11/2007 | Chitti |
| 2008/0010215 | A1 | 1/2008 | Rackley, III et al. |
| 2008/0017704 | A1 | 1/2008 | VanDeburg et al. |
| 2008/0099552 | A1* | 5/2008 | Grillion ........... G06Q 40/02 235/380 |
| 2008/0116283 | A1 | 5/2008 | Newbrough et al. |
| 2008/0160974 | A1 | 7/2008 | Vartiainen et al. |
| 2008/0167017 | A1 | 7/2008 | Wentker et al. |
| 2008/0185433 | A1 | 8/2008 | Ando et al. |
| 2008/0207203 | A1 | 8/2008 | Arthur et al. |
| 2008/0207234 | A1 | 8/2008 | Arthur et al. |
| 2008/0208741 | A1 | 8/2008 | Arthur et al. |
| 2008/0208742 | A1 | 8/2008 | Arthur et al. |
| 2008/0208743 | A1 | 8/2008 | Arthur et al. |
| 2008/0208744 | A1 | 8/2008 | Arthur et al. |
| 2008/0208762 | A1 | 8/2008 | Arthur et al. |
| 2009/0036103 | A1 | 2/2009 | Byerley et al. |
| 2010/0093396 | A1 | 4/2010 | Roundtree |
| 2016/0189137 | A1 | 6/2016 | Zhou |
| 2018/0268392 | A1 | 9/2018 | Arthur et al. |

OTHER PUBLICATIONS

U.S. Appl. No. 11/830,409, "Non-Final Office Action" mailed Dec. 30, 2013, 16 pages.
U.S. Appl. No. 11/830,409, "Non-Final Office Action" mailed Jul. 15, 2014, 21 pages.
PCT/US2008/054679, "International Search Report and Written Opinion" mailed Jun. 5, 2008; all pages.
PCT/US2008/054679, "International Preliminary Report on Patentability" mailed Aug. 26, 2009; all pages.
Authorization.net, downloaded on Jan. 16, 2009, 9 pages http://web.archive.org/web/20050316102434/http://www.authorize.net/resourc es/faqs.
Internet Archive Wayback Machine, downloaded Mar. 22, 2010, 1 page. http://web.archive.org/web/*/http://www.3xswco.uk.
Kwok et al., "Digital Rights Management for Mobile Commerce Using Web Services," *Journal of Electronic Commerce Research*, vol. 7, No. 1, 2006, entire document.
Non-Final Office Action mailed Oct. 25, 2019 in related U.S. Appl. No. 15/920,089, all pgs.
Final Office Action mailed Mar. 3, 2011 in related U.S. Appl. No. 11/830,409, all pgs.
Advisory Action mailed May 12, 2011 in related U.S. Appl. No. 11/830,409, all pgs.
Non-Final Office Action mailed Dec. 30, 2013 in related U.S. Appl. No. 11/830,409, all pgs.
Non-Final Office Action mailed Jul. 15, 2014 in related U.S. Appl. No. 11/830,409, all pgs.
Final Office Action mailed Nov. 26, 2014 in related U.S. Appl. No. 11/830,409, all pgs.
Advisory Action mailed Feb. 5, 2015 in related U.S. Appl. No. 11/830,409, all pgs.

(56) References Cited

OTHER PUBLICATIONS

Advisory Action mailed Mar. 10, 2015 in related U.S. Appl. No. 11/830,409, all pgs.

* cited by examiner

MARKETING MESSAGES IN MOBILE COMMERCE

CROSS-REFERENCES TO RELATED APPLICATIONS

This application is a continuation application of U.S. Nonprovisional application Ser. No. 15/920,089, filed Mar. 13, 2018 and entitled "Marketing Messages in Mobile Commerce," which is a continuation application of U.S. Nonprovisional application Ser. No. 11/830,409, filed Jul. 30, 2007 and entitled "Marketing Messages in Mobile Commerce," which claims priority to U.S. Provisional Application No. 60/891,106, filed Feb. 22, 2007 and entitled "Mobile Commerce Systems and Methods" and U.S. Provisional Application No. 60/911,113, filed Apr. 11, 2007 and entitled "Mobile Commerce Infrastructure Systems and Methods." The entire disclosure for each of the above listed applications is hereby incorporated by reference in its entirety for all purposes.

This application is also related to the following commonly-owned, co-pending applications, of which the entire disclosure of each is incorporated herein by reference, as if set forth in full in this document, for all purposes: U.S. Pat. No. 8,566,239, issued Oct. 22, 2013, and entitled "Mobile Commerce Systems and Methods"; U.S. patent application Ser. No. 11/830,362, abandoned; U.S. patent application Ser. No. 11/830,392, filed Jul. 30, 2007, and entitled "Enrollment and Registration of a Device in a Mobile Commerce System"; U.S. patent application Ser. No. 11/830,420, abandoned; U.S. patent application Ser. No. 11/830,436, abandoned; U.S. patent application Ser. No. 11/830,459, filed Jul. 30, 2007, and entitled "Payments Using a Mobile Commerce Device"; and U.S. patent application Ser. No. 11/830,336, abandoned.

BACKGROUND OF THE INVENTION

Embodiments of the present invention generally relate to payment systems. More specifically, embodiments of the present invention relate to payment systems supporting use of mobile electronic devices in various types of financial transactions.

Today, merchants and service providers accept many forms of payment. Many merchants will accept cash, credit cards, debit cards, stored-value cards, checks, and promotional items such as coupons. All of these forms of payment are often carried by a consumer because some merchants and/or service providers may only accept some of the various possible forms of payment. Sometimes, a customer may not pre-plan a visit to a specific merchant and/or service provider. So, the consumer may wish to carry the different forms of payment in case the consumer does happen to make an unplanned visit.

This can lead to numerous methods of payments being carried by a consumer on a day-to-day basis. Additionally, a consumer may also need to carry other items regularly such as a driver's license, identification cards, loyalty program cards, and membership cards. When a consumer has to carry all of these items, they may also become disorganized and misplaced, causing security concerns, and possibly causing transactions to consume more time.

Additionally, various forms of wireless or contactless devices have been introduced for use in various types of transactions. For example, contactless transaction initiation is often performed with a "smart" card or other device such as a key fob or a mobile device such as a cell phone or Personal Digital Assistant (PDA) containing a memory and a processor. Such a card or device typically also includes Radio-Frequency IDentification ("RFID") or Near-Field Communications (NFC) components for contactless communication with a Point-Of-Sale (POS) device. The information stored in the memory of the device and communicated via the RFID or NFC components to the POS device is generally similar or identical to the information recorded on the magnetic stripe of a card, i.e., account number etc. Thus, in some cases, such devices may be utilized instead of more conventional cards.

However, current payment systems that use contactless devices are restricted to particular payment channels. For example, in some systems, payment requests initiated by the use of a contactless device are routed through a conventional debit or credit authorization network. In other systems, payment requests are processed offline by the device, which includes a "stored value" account balance. In other cases, transactions involving such stored value or pre-paid accounts are processed online by systems maintaining account balance and other information. The networks and systems handling credit, debit, pre-paid, and possibly other accounts are separate from each other. Furthermore, these networks and systems may not be compatible or interoperable. Therefore, a device intended for use on one network or system may not be usable on a POS device operating on another network. Additionally, the ability of any given device to handle more than one account or account type is limited. Therefore, the use of such contactless devices has not successfully reduced the number of different forms of payment a consumer carries. Hence, there is a need in the art for improved methods and systems for utilizing mobile electronic devices in various types of financial transactions.

BRIEF SUMMARY OF THE INVENTION

Methods, systems, and machine-readable media are disclosed for providing marketing messages to a mobile device. According to one embodiment, a method of providing one or more marketing messages to a mobile device in a mobile commerce system can comprise receiving at a mobile wallet server a set of information from an acquirer system. The set of information can identify one or more marketing offers. One or more marketing messages can be generated by the mobile wallet server based on the set of information identifying the one or more marketing offers. For example, the marketing messages can comprise Short Message Service (SMS) messages, email messages, or other types of messages. Each of the one or more marketing messages can be sent from the mobile wallet server to one or more mobile devices.

The method can include generating with the acquirer system the set of information identifying the one or more marketing offers and sending the set of information identifying the one or more marketing offers to the mobile wallet server. Generating the set of information identifying the one or more marketing offers can be based on a selection of one or more predefined marketing offers. Additionally or alternatively, generating the set of information identifying the one or more marketing offers can be based on information provided to the acquirer system from a marketing entity. In some cases, generating the set of information identifying the one or more marketing offers can comprise determining with the acquirer system one or more recipients for the marketing offers. For example, determining one or more recipients for the marketing offers can be based at least in part on a preference information for the one or more recipients.

Additionally or alternatively, generating the set of information identifying the one or more marketing offers can comprise determining with the mobile wallet server one or more recipients for the marketing offers. In such a case, determining one or more recipients for the marketing offers can be based at least in part on the set of information identifying the one or more marketing offers. Additionally or alternatively, determining one or more recipients for the marketing offers can be based at least in part on a preference information for the one or more recipients.

According to another embodiment of the present invention, a system can comprise a wireless communications network, such as a cellular network, and a plurality of mobile devices communicatively coupled with the wireless communications network. Each mobile device can be adapted to execute a mobile wallet application. The system can also include an acquirer system adapted to generate a set of information identifying one or more marketing offers. A mobile wallet server can be communicatively coupled with the wireless communications network and the acquirer system. The mobile wallet server can be adapted to receive the set of information identifying the one or more marketing offers from the acquirer system, generate one or more marketing messages based on the set of information identifying the one or more marketing offers, and send each of the one or more marketing messages to the mobile wallet application of one or more mobile devices via the wireless communications network. For example, the marketing messages can comprise Short Message Service (SMS) messages, email messages, or other types of messages.

The acquirer system can generate the set of information identifying the one or more marketing offers based on a selection of one or more predefined marketing offers. Additionally or alternatively, the acquirer system can generate the set of information identifying the one or more marketing offers based on information provided to the acquirer system from a marketing entity. In some cases, the acquirer system can be further adapted to determine one or more recipients for the marketing offers. In such cases, the acquirer system can be adapted to determine one or more recipients for the marketing offers based at least in part on preference information for the one or more recipients.

Additionally or alternatively, the mobile wallet server can be further adapted to determine one or more recipients for the marketing offers. For example, the mobile wallet server can be adapted to determine one or more recipients for the marketing offers based at least in part on the set of information identifying the one or more marketing offers. Additionally or alternatively, the mobile wallet server can be adapted to determine one or more recipients for the marketing offers based at least in part on a preference information for the one or more recipients.

According to yet another embodiment, a machine-readable medium can have stored thereon a series of instruction which, when executed by a processor, causes the process to provide one or more marketing messages to a mobile device by receiving at a mobile wallet server a set of information from an acquirer system. The set of information can identify one or more marketing offers. One or more marketing messages can be generated by the mobile wallet server based on the set of information identifying the one or more marketing offers. For example, the marketing messages can comprise Short Message Service (SMS) messages, email messages, audio, video, executable applets or applications, or other types of messages. Each of the one or more marketing messages can be sent from the mobile wallet server to one or more mobile devices.

The set of information identifying the one or more marketing offers can generated by the acquirer system and sent to the mobile wallet server. Generating the set of information identifying the one or more marketing offers can be based on a selection of one or more predefined marketing offers. Additionally or alternatively, generating the set of information identifying the one or more marketing offers can be based on information provided to the acquirer system from a marketing entity. In some cases, generating the set of information identifying the one or more marketing offers can comprise determining with the acquirer system one or more recipients for the marketing offers. For example, determining one or more recipients for the marketing offers can be based at least in part on a preference information for the one or more recipients.

Additionally or alternatively, generating the set of information identifying the one or more marketing offers can comprise determining with the mobile wallet server one or more recipients for the marketing offers. In such a case, determining one or more recipients for the marketing offers can be based at least in part on the set of information identifying the one or more marketing offers. Additionally or alternatively, determining one or more recipients for the marketing offers can be based at least in part on a preference information for the one or more recipients.

DETAILED DESCRIPTION OF THE INVENTION

Figure 1:
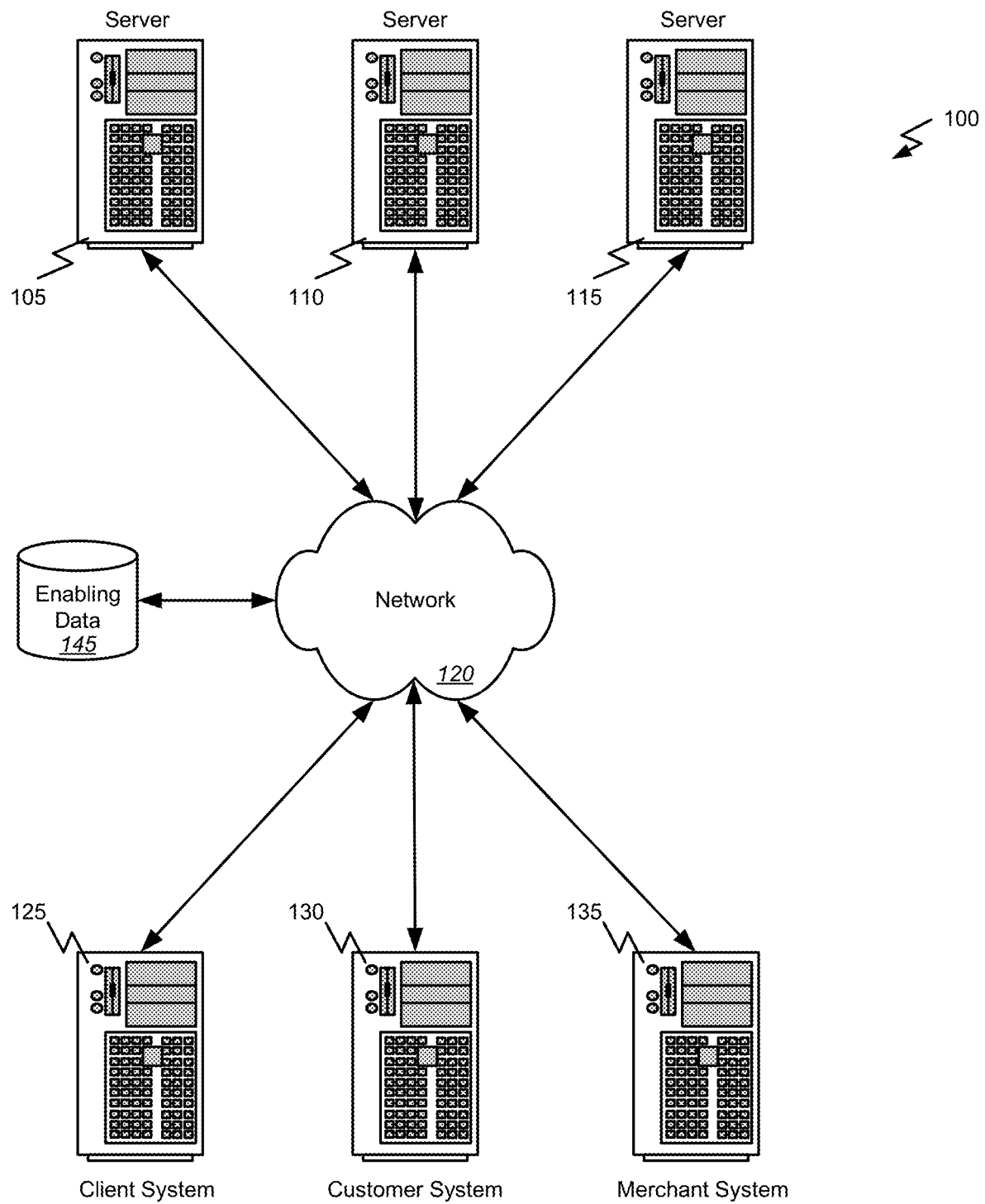
FIG. 1 is a block diagram illustrating an exemplary environment in which embodiments of the present invention may be implemented.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Embodiments of the invention provide methods and systems for processing various financial transactions initiated by or otherwise involving use of a contactless or mobile device. In some such embodiments, the processes are executed by an entity on behalf of one or more client organizations. The description below sometimes provides illustrations that use an example where a client organization is a financial institution, but there is no such requirement for the invention and the methods are intended also to be applicable to other types of organizations that make use of large collections of data. For example, embodiments of the invention may also be used for managing health-care documents or information.

The description herein sometimes refers to "clients" and to "customers." Reference to "clients" is intended to refer to persons, i.e. individuals, entities, or their agents, on whose behalf a set of information is managed. Reference to "customers" or "consumer" is intended to refer to persons, i.e. individuals, entities, or their agents, who are the subject of or related to that information. Thus, merely for purposes of illustration, in the case where the information comprises credit-card account records for a credit card issued to Mr. Jones by Bank A, Bank A corresponds to a client and Mr. Jones corresponds to a customer or consumer.

In describing embodiments of the invention, reference is sometimes made to other terms having specific intended meanings. For example, as used herein, the term "acquirer" is used to refer to a business entity that has a business relationship with a merchant, one or more financial institutions, and other entities and handles credit card and/or other financial transactions for and/or involving those entities. In such a context, an "acquirer system" is a system operated by an acquirer that processes and authorizes credit card and/or other transactions. Acquirer systems can include those operated by credit card processing entities, such as First Data Corporation, Greenwood Village, Colorado. However, embodiments of the present invention are not limited to such financial services or payment processing. Thus, an acquirer system can be considered to be any system capable of receiving a communication from another system or entity and processing information on behalf of that entity.

The term "carrier" refers to a provider of a network and/or service for use by a mobile device. For example, a carrier can include, but is not limited to, a provider of a cellular or other wireless communications service for use by a mobile device. The terms "carrier" and "service provider" are used interchangeably herein and are intended to be synonymous. Similarly, the terms carrier network and service provider network are used interchangeably herein and are intended to be synonymous.

An "electronic receipt" refers to a receipt for payment of goods or services that can be created for and relate to one or more transactions. An electronic receipt can include information related to the transaction(s) and may be electronically transferred to the user's mobile device. According to one embodiment, electronic receipts can be stored in a mobile wallet of the mobile device.

The term "mobile device" is used herein to refer to any small, likely handheld, electronic device that can be used to initiate or otherwise participate in a financial transaction. For example, a mobile device can include, but is not limited to, a cellular telephone, a Personal Digital Assistant (PDA), a smart card or other contactless device, etc. Exemplary devices that may be adapted for use as mobile devices in various embodiments of the present invention are described in co-pending and commonly assigned U.S. patent application Ser. No. 11/672,417 entitled "Contactless Electronic Wallet Payment Device" filed on Feb. 7, 2007; U.S. patent application Ser. No. 11/551,063 entitled "Presentation Instrument with Non-Financial Functionality" filed on Oct. 19, 2006; and U.S. Provisional Patent Application No. 60/833,022 entitled "Mobile Payment Device with Magnetic Stripe" filed on Jul. 24, 2006, each of which is incorporated herein by reference in its entirety for all purposes. As used herein, the terms mobile device and contactless device are intended to be synonymous.

A "mobile wallet" or "mobile wallet application" refers to a client software application that can reside on and/or be executed by a mobile device. According to one embodiment, the mobile wallet application can be adapted to store payment vehicle information. In some cases, the mobile wallet can allow storage of multiple payment vehicles and can provide a user interface that can be used to select a specific payment vehicle. Additionally, the mobile wallet can be adapted to provide security to deter fraudulent and unauthorized use of the payment vehicles. The terms mobile wallet and mobile wallet application are used interchangeably herein and are intended to be synonymous.

A "mobile wallet server" is a server and/or server-side process communicating with and supporting functions of a mobile wallet application. For example, functions that can be performed by the mobile wallet server can include but are not limited to downloading and installing the mobile wallet application, updating balance information for the accounts stored therein, performing or facilitating various transfers between those accounts, viewing transaction histories for the accounts, providing marketing messages, e.g., coupons and advertisements, redeeming coupons, etc.

"Near Field Communication" (NFC) refers to short range (20 cm or less) wireless technology used to facilitate communication between electronic devices in close proximity. For example, embodiments of the present invention provide for the use of NFC and/or other relatively short range communications between a mobile device and a POS device such as when a user of the mobile device scans or waves the mobile device in front of or near the POS device when paying for goods or services.

A "payment network" refers herein to an infrastructure that supports the exchange of data in implementing payment transactions. It is anticipated that the data exchange typically proceeds between merchants and financial institutions. Examples of existing commercial networks that are included within the definition of "payment network" include the STAR/MAC network, the NYCE® network, the VISA® network, and the MasterCard® network. Access to a network by a consumer can be achieved through entry of a secret code, such as a personal identification number ("PIN"), in combination with data extracted from the mobile device. In some embodiments, a signature of the consumer may be used in lieu of a secret code. In some instances, particularly in support of transactions having a low value, a consumer might be permitted access to the payment network with only information extracted from the mobile device, without the need to provide a PIN or signature.

The term "payment vehicle" is used herein to refer to a method of payment. For example, payment vehicles can include, but are not limited to, credit, debit, stored-value, and other types of accounts. In some embodiments, a payment vehicle can include loyalty points or other value accumulated, for example, under a loyalty program.

A "point-of-sale device" or "POS device" refers herein to any physical device situated at a location where a consumer may provide payment in support of a transaction. Such physical locations are typically merchant locations, such as where the POS device is operated by a clerk or is available for self-operation by the consumers, but may also be in other locations. For instance, certain automatic teller machines "ATMs" may be equipped to support transactions for the sale of movie or sporting-event tickets even remote from the merchant location. Other similar types of transactions that may be performed with a POS device at a location remote from the merchant will also be evident to those of skill in the art. In some cases, a personal computer equipped with the appropriate structure may be used as a POS device even when located on the consumer premises. Examples of POS devices thus include, without limitation, personal computers, cash registers, and any devices capable of reading a magnetic stripe, an RFID chip, NFC communications, or other information from a mobile device, contactless device, card, etc. Exemplary devices that may be adapted for use in various embodiments of the present invention are described in the following commonly assigned applications, the entire disclosures of which are incorporated herein by reference for all purposes: U.S. Provisional Patent Application No. 60/147,889, entitled "Integrated Point OF Sale Device," filed Aug. 9, 1999 by Randy J. Templeton et al.; U.S. patent application Ser. No. 09/634,901, entitled "Point of Sale Payment System," filed Aug. 9, 2000 by Randy J. Templeton et al.; U.S. patent application Ser. No. 10/116,689, entitled "Systems and Methods for Performing Transactions at a Point-of-Sale," filed Apr. 3, 2002 by Earney Stoutenburg et al.; U.S. patent application Ser. No. 10/116,733, entitled "Systems and Methods for Deploying a Point-of-Sale System," filed Apr. 3, 2002 by Earney Stoutenburg et al.; U.S. patent application Ser. No. 10/116,686, entitled "Systems and Methods for Utilizing A Point-of-Sale System," filed Apr. 3, 2002 by Earney Stoutenburg et al.; and U.S. patent application Ser. No. 10/116,735, entitled "Systems and Methods for Configuring a Point-of-Sale System," filed Apr. 3, 2002 by Earney Stoutenburg.

A "POS processing system" refers to a computational system used by merchants to control communications between POS devices and payment networks. Such systems may be run internally by merchants, may be run by merchant consortia, or may be outsourced to service providers in different embodiments. Some exemplary POS processing systems which may be adapted to operate with embodiments of the present invention are described in commonly assigned U.S. Pat. Nos. 6,886,742, 6,827,260 and 7,086,584, the complete disclosures of which are herein incorporated by reference.

A "primary account number" or "PAN" refers to a number assigned to an account. The PAN is generally assigned by a financial institution maintaining the account. In most embodiments, it is anticipated that the PAN will identify an account associated with the wireless device and be included as data stored by the memory of the wireless device. Identification of the PAN permits a financial institution that maintains the account to make a unique identification of the consumer initiating a payment or other transaction and determine which of potentially several accounts is to be used in supporting the transaction.

The terms "real time" or "near real time" are used herein to refer to a process or action that occurs within a relatively short time. Importantly, the terms real time and near real time are not intended to imply an immediate or instantaneous results or action. Rather, the terms are used to refer to processes or actions that can be performed relatively quickly such as within several seconds or minutes.

The term "user" refers to an entity, typically a person, that is associated with a particular mobile device. Typically, the user is the person that owns, uses, or leases the mobile device and/or controls the content and use of the payment vehicles maintained within the mobile wallet of the device.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to, portable or fixed storage devices, optical storage devices, wireless channels, and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. One or more processors may perform the necessary tasks.

Embodiments of the present invention provide methods, systems, and machine-readable media for supporting use of mobile devices in various types of financial transactions. Generally speaking, a mobile device such as a cell phone, PDA, MP3 player, or other device can be adapted to maintain account information related to one or more financial accounts. For example, information such as a bank name, account number, account type, etc. can be maintained in the device in and/or accessible by a mobile wallet. In other cases, identifying information other than an account number may be stored in or by the mobile wallet. For example, rather than storing an account number, the mobile wallet may store or generate a unique identifier for use by other systems in identifying one or more accounts associated with the mobile wallet. As will be seen, the mobile wallet and other elements described herein can allow the user of the mobile device to use the account information stored therein to make purchases, receive and maintain receipts or other records of transactions, look up account balances, transfer balances, etc.

FIG. 1 is a block diagram illustrating an exemplary environment in which embodiments of the present invention may be implemented. In this example, the system can include one or more server computers 105, 110, 115 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to execute a plurality of processes related to financial transactions of one or more consumers on behalf of one or more client financial institutions. For example, one or more of the servers 105, 110, 115 may execute one or more processes for recording transactions on a credit card issued to the consumer by the financial institution. Other processes may provide for paying a merchant for the consumer's purchase, billing the consumer, etc. The applications can also include any number of applications for controlling access to resources of the servers 105, 110, 115.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5G, CDMA, CDMA2000, WCDMA, EVDO etc.

The system 100 can include one or more user computers which may be used to operate a client, whether a dedicate application, web browser, etc. For example, the user computers can include a client system 125 operated by a client financial institution, a customer system 130 operated by a customer or consumer, a merchant system 135 operated by a merchant or vendor, etc. The user computers 125, 130, 135 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 125, 130, 135 may also have any of a variety of applications, including one or more development systems, database client and/or server applications, and web browser applications. Alternatively, the user computers 125, 130, 135 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with three user computers, any number of user computers may be supported.

The system 100 may also include one or more databases or repositories of enabling data 145. The database(s) of enabling data 145 may reside in a variety of locations. By way of example, a database 145 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 145 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 145 may be a relational database that is adapted to store, update, and retrieve data in response to SQL-formatted commands. The repository of enabling data 145 can include a wide variety of information related to financial transactions related to the consumer and/or specified by different entities such as merchants, financial institutions, third-party advertisers, etc.

Figure 2:
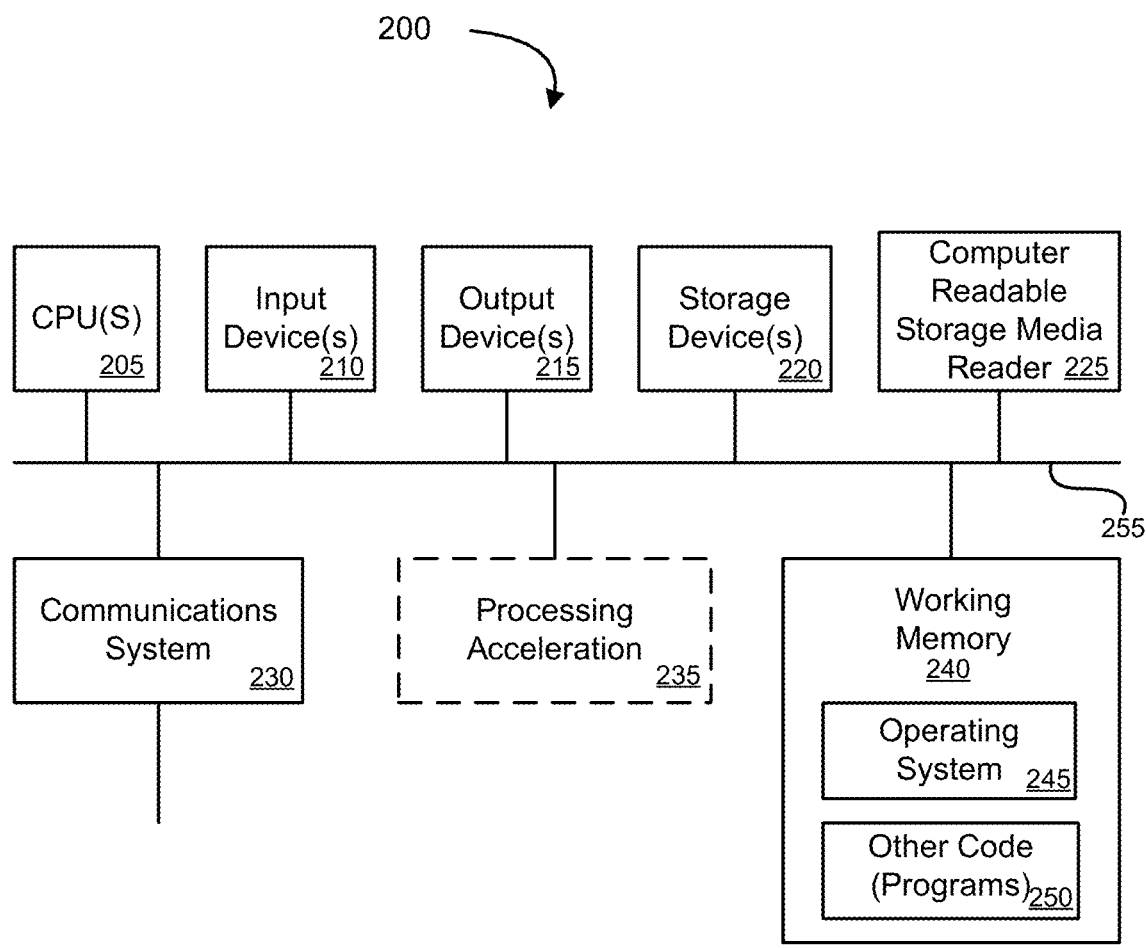
FIG. 2 is a block diagram illustrating an exemplary computer system upon which embodiments of the present invention may be implemented.

FIG. 2 is a block diagram illustrating an exemplary computer system upon which various elements of the exemplary environment illustrated in FIG. 1 may be implemented. The computer system 200 is shown comprising hardware elements that may be electrically coupled via a bus 255. The hardware elements may include one or more central processing units (CPUs) 205; one or more input devices 210 (e.g., a scan device, a mouse, a keyboard, etc.); and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225; a communications system 230 (e.g., a modem, a network card (wireless or wired), an infra-red communication device, etc.); and working memory 240, which may include RAM and ROM devices as described above communicatively coupled with and readable by CPU(s) 205. In some embodiments, the computer system 200 may also include a processing acceleration unit 235, which can include a DSP, a special-purpose processor and/or the like.

The computer-readable storage media reader 225 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with a network and/or any other computer or other type of device.

The computer system 200 may also comprise software elements, shown as being currently located within a working memory 240, including an operating system 245 and/or other code 250, such as an application program. The application programs may implement the methods of the invention as described herein. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Figure 3:
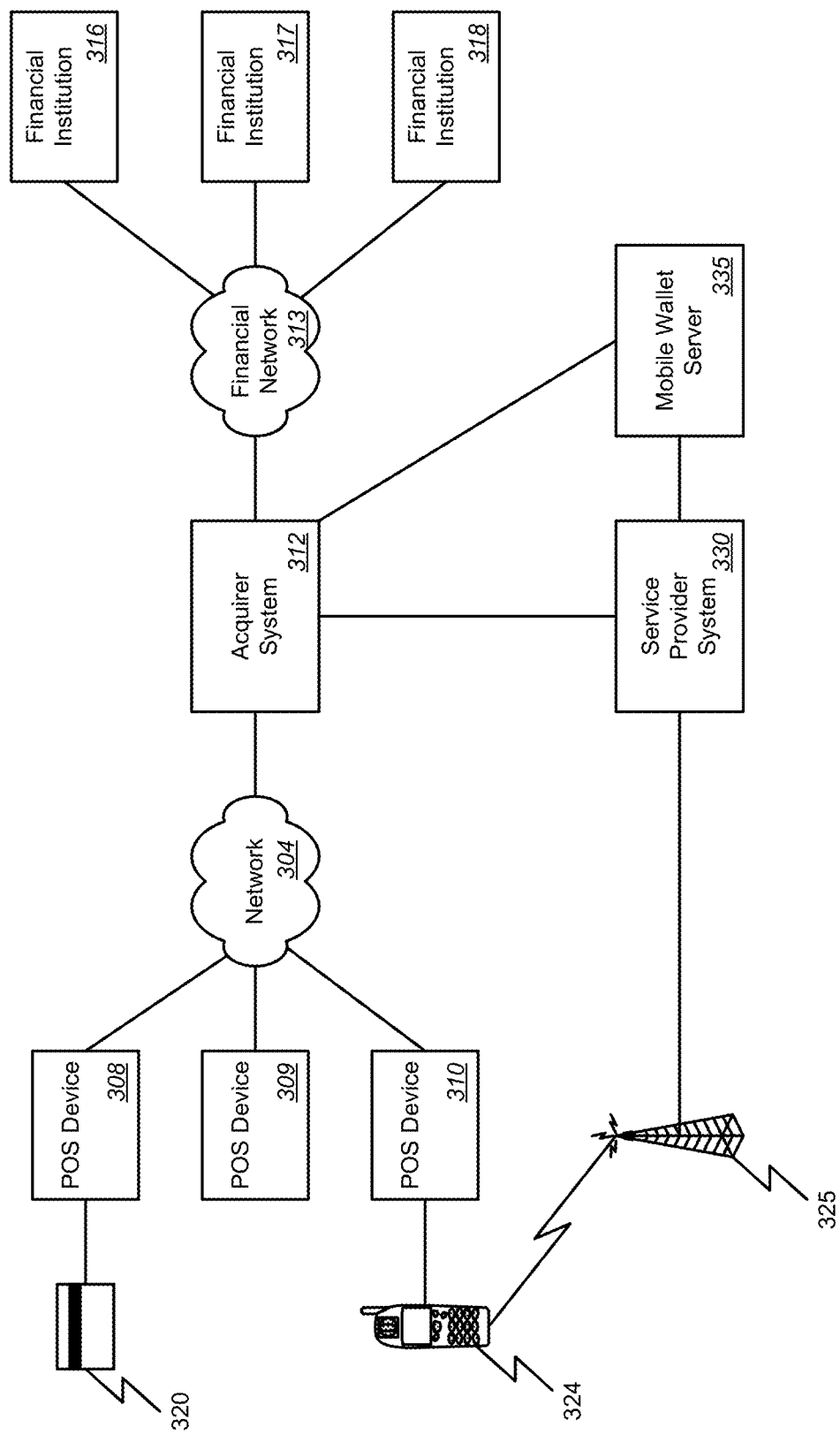
FIG. 3 is block diagram illustrating, at a high level, a system for processing transactions utilizing a mobile electronic device according to one embodiment of the present invention.

FIG. 3 is block diagram illustrating, at a high level, a system for processing transactions utilizing a mobile electronic device according to one embodiment of the present invention. Traditionally, a credit card may be issued to a customer by a financial institution such as a bank and typically displays a logo for an association that implements rules that govern aspects of use of the card. Account information is usually printed on the face of the card, specifying an account number and name of an authorized holder of the card. This information is also stored together with additional information on a magnetic stripe that is usually affixed to the back of the card. When the cardholder wishes to execute a transaction, such as a financial transaction for the purchase of goods and/or services, he presents the card 320 to a clerk at a merchant location, who swipes the card through a magnetic-stripe reader comprised by a point-of-sale device 308. Multiple point-of-sale devices 308-310 may have been provided at a variety of locations by an acquirer, who acts as an intermediary between merchants and the issuer financial institutions. As an intermediary, the acquirer coordinates transaction routing and performs a variety of backend processes.

The point-of-sale device 308 typically initiates a connection to an acquirer system 312 through a network 304 such as the Internet or another network as described above. A packet of information that includes information read from the magnetic stripe of the card 320, a merchant identifier, the date, and transaction amount are forwarded by the point-of-sale device 308 through the network 304 to the acquirer system 312. The acquirer system 312 may store some of the information and send an authorization request, via financial network 313, to the issuing financial institution 316, which may be identified from a portion of the account number read from the magnetic stripe. The transaction is authorized or denied depending on such factors as the validity of the cardholder name, the validity of the card number, the level of available credit in comparison with the transaction amount, and the like. If authorized, an authorization code is routed back through the acquirer system 312, which captures additional information and forwards the authorization code back to the originating point-of-sale device 308 so that the transaction may be completed. Periodically, such as at the end of every day, the transactions are settled by the acquirer initiating funds transfers that fund merchant bank accounts with total transaction amounts that may have resulted from multiple transactions by multiple customers.

Other types of accounts may operate with similar structures, although the details for each type of account are different. For example, use of a debit account typically requires that the customer provide a personal identification number ("PIN"), which must be validated before any authorization for the transaction can be provided. Authorization usually depends on the current level of funds actually in the identified account rather than on a credit level, and funds transfer is usually executed substantially contemporaneously with providing the authorization rather than performing periodic settlement. Other types of accounts may use arrangements that have similar differences in their particulars.

According to one embodiment, a mobile device 324 may be used in addition to or instead of a card or other token representing an account. Here, the mobile device 324 is shown for exemplary purposes in the form of a cellular telephone. However, as noted above, the mobile device 324 may be any of a variety of different mobile devices including but not limited to a PDA, MP3 player, etc. The mobile device 324 may communicate according to its normal wireless protocols with a service provider system 330 via an existing network of relay stations 325. In addition, the mobile device 324 may communicate wirelessly with point-of-sale devices 314 that have been equipped for wireless communications, such as through an NFC connection.

According to one embodiment and as will be discussed in greater detail below, the mobile device 324 can store and/or execute a mobile wallet application adapted to maintain account numbers and/or other information related to one or more financial accounts such as credit accounts, debit accounts, demand deposit accounts, stored value accounts, etc. maintained by one or more financial institutions 316-318. The mobile device 324, for example via the mobile wallet application, may allow the user to review accounts that are stored or identified in the mobile device 324 and select an account for a particular transaction such as a purchase. Upon selection of an account for use in the transaction, the user of the mobile device can scan or swipe the device 324 in front of or near the POS device 310 causing the information related to the selected account to be read from the mobile device 324 via the NFC connection.

The information regarding the selected account can identify the account to be used in supporting transactions, for example, including an indication of the financial institution 316 where that account is maintained, an account number, etc. Such identifications may conveniently be made with numerical strings similar to card numbers that have portions that identify a financial institution and portions that identify specific accounts. Additional information may include ownership details of the account, current balance levels for the account, and the like.

The point-of-sale device 308 typically initiates a connection to an acquirer system 312 through a network 304 such as the Internet or another network as described above. A packet of information that includes information read from the mobile device 324, a merchant identifier, the date, and transaction amount are forwarded by the point-of-sale device 310 through the network 304 to the acquirer system 312. The acquirer system 312 may store some of the information and send an authorization request, via financial network 313, to the issuing financial institution 318, which may be identified from a portion of the account number read from the mobile device 324. The transaction is authorized or denied depending on such factors as the validity of the account holder name, the validity of the account number, the level of available credit in comparison with the transaction amount, and the like. If authorized, an authorization code is routed back through the acquirer system 312, which captures additional information and forwards the authorization code back to the originating point-of-sale device 310 so that the transaction may be completed.

As will be seen, the mobile wallet and/or other applications of the mobile device may be used to initiate and/or perform other mobile commerce functions. For example, the mobile wallet and other elements described herein can allow the user of the mobile device to use the device to make purchases, receive and maintain receipts or other records of transactions, look up account balances, transfer balances, etc. As noted above, embodiments described herein provide for the use mobile devices operating different mobile wallet applications on devices operating on different carrier networks. Additionally, embodiments of the present invention can be used to interact with a wide variety of other systems such as financial institutions, payment networks, advertisers, and other content providers.

The system can also include a mobile wallet server 335 communicatively coupled with the service provider system 330 and/or the acquirer system 312. As will be described in detail below, the mobile wallet server 335 can communicate with the mobile device 324, for example via the service provider network 325 and supporting functions of the mobile wallet application. For example, functions that can be performed by the mobile wallet server can include but are not limited to downloading and installing the mobile wallet application, updating balance information for the accounts stored therein, performing or facilitating various transfers between those accounts, viewing transaction histories for the accounts, providing marketing messages, e.g., coupons and advertisements, redeeming coupons, etc.

Figure 4:
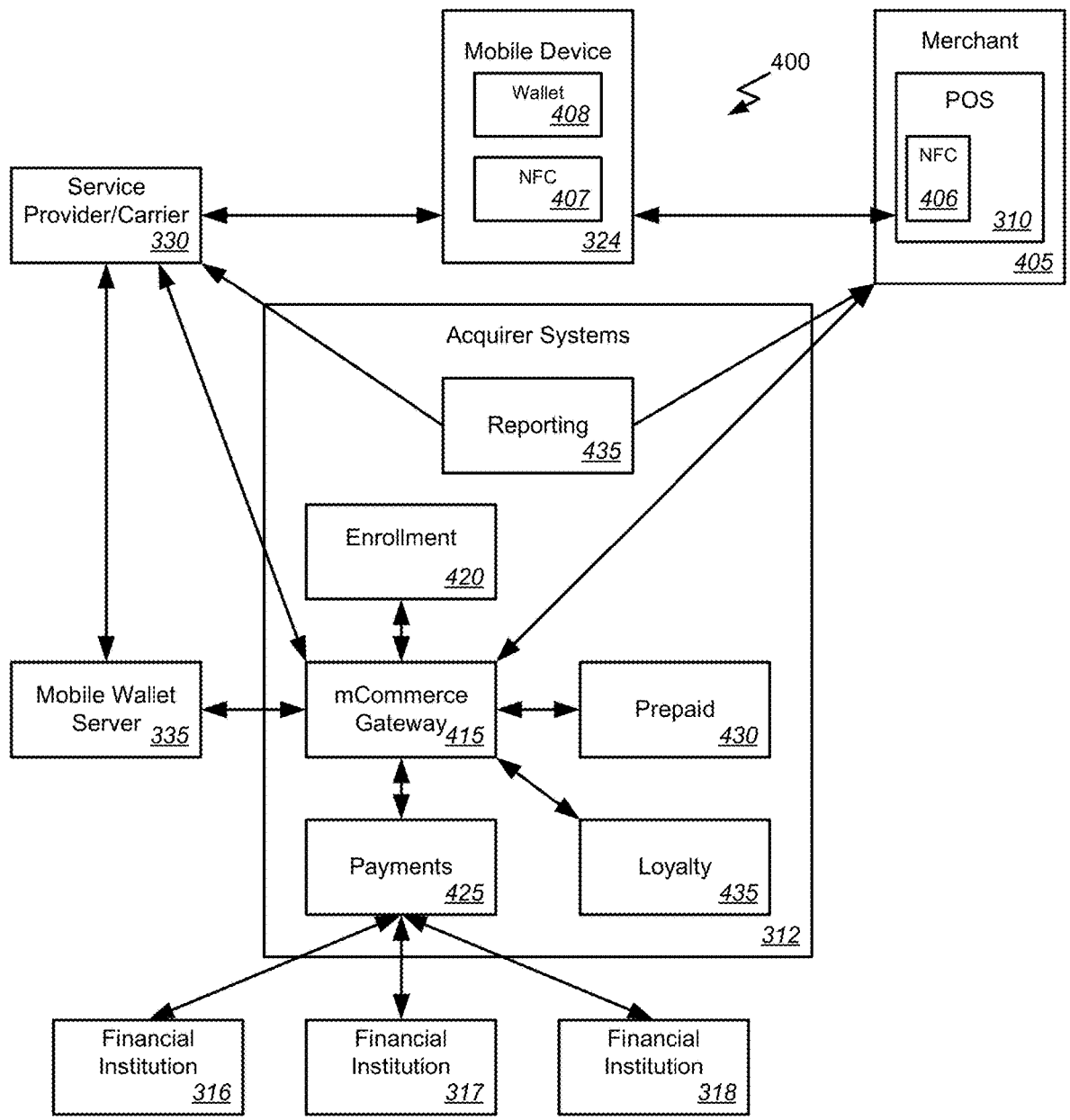
FIG. 4 is a block diagram illustrating additional details of the system of FIG. 3 according to one embodiment of the present invention.

FIG. 4 is a block diagram illustrating additional details of the system of FIG. 3 according to one embodiment of the present invention. In this example, the system 400 includes a mobile device 324 such as described above. The mobile device 324 can include a Near Field Communications (NFC) transponder 407 and can execute a mobile wallet application 408. The mobile device 324 can be adapted to maintain at least one set of information related to a financial account in the mobile wallet 408 and communicate at least a subset of the information related to the financial account via the NFC transponder 407 upon initiation of a transaction such as a purchase. In some cases, the mobile wallet 408 of the mobile device 324 can maintain information related to a plurality of financial accounts such as, for example, debit accounts, demand deposit accounts, stored value accounts, loyalty accounts under a customer loyalty program, etc. In such cases, the mobile wallet 408 of the mobile device 324 can be adapted to present the plurality of financial accounts to a user of the mobile device 324 and receive a selection of a financial account for the transaction. The mobile device 324 can also be adapted to communicate at least a subset of the information related to the selected financial account via the NFC transponder 407 upon initiation of the transaction.

So, for example, the user of the mobile device 324 can scroll through or otherwise navigate a user interface of the mobile device 324 to select an account for which identifying information is stored in or by the mobile wallet 408. The information can include, for example, an account number, an account name, an account type, a bank name, and/or other information such as, for example, may be typically encoded on a magnetic stripe of a card. In other cases, the mobile wallet and/or other applications of the mobile device may be used to initiate and/or perform other mobile commerce functions. For example, the mobile wallet and other elements described herein can allow the user of the mobile device to use the device to make purchases, receive and maintain receipts or other records of transactions, look up account balances, transfer balances, etc. Once selected, the user can then use the account to perform a transaction such as making a purchase, transferring an account balance, looking up an account balance, viewing a transaction history, etc. In the case where the user is making a purchase, from a merchant 405, the user can use the selected account to pay for the purchase by swiping or passing the mobile device 324 in front of or near an NFC equipped point of sale device 310 provided by the merchant 405.

The point of sale device 310 can also include an NFC transponder 406. The point of sale device 310 can be adapted to receive the information related to the financial account from the mobile device 324 via the NFC transponder 406 and send a communication related to the transaction that includes the information related to the financial account. For example, in the case of a consumer making a purchase using a credit, debit, stored value, or other account, the request can be a request to authorize the transaction.

A mobile commerce gateway 415 can be adapted to receive the communication related to the transaction from the point of sale device 310 of the merchant system 405 and route the communication for handling of the transaction based on the information related to the financial account. That is, the acquirer systems 312 can include a plurality of systems 415-435 adapted to perform functions related to various types of financial transaction. For example, the acquirer systems 315 can include but are not limited to a payments system 425 adapted to communicate with financial institutions 316-318 maintaining the financial account and authorize the transaction based on the communication with the financial institution as described above. The acquirer systems 312 can also include an enrollment system 420 adapted to register or enroll the mobile device 324 for use with the system 400. A loyalty system 421 can be adapted to maintain a loyalty account under a customer loyalty program. A stored value system and/or prepaid system 430 can be adapted to maintain a stored value account. The mobile commerce gateway 415 can be adapted to route communications to the plurality of acquirer systems 312 based at least in part on a transaction type. As can be understood by one skilled in the art, the mobile commerce gateway 415, while illustrated here as a single element, may comprise multiple systems or devices. Additionally or alternatively, various elements of the system 400 shown here as communicatively coupled with the mobile commerce gateway 415 may, in various implementations, be coupled with the mobile commerce gateway 415 via various other portals, front-ends, gateways, etc. In yet other implementations, the mobile commerce gateway 415 may be excluded from the system 400 or may not be utilized by some of the elements. In such cases, various elements of the system 400 such as a POS device 310, mobile wallet server 335, etc. may interface with one or more of the acquirer systems 312 other than the mobile commerce gateway 415.

The system 400 can also include a service provider system 330 communicatively coupled with the mobile device 324, for example via a cellular or other wireless network. A mobile wallet server 410 can be communicatively coupled with the service provider system 330 and the mobile commerce gateway 415. The mobile wallet server 410 can be adapted to interact with the mobile wallet 408 of the mobile device 324 via the service provider system 330. For example, the mobile wallet server 410 can interact with the mobile wallet 408 of the mobile device 324 to provide functions related to maintenance of the mobile wallet 408. In another example, the mobile wallet server can interact with the mobile wallet of the mobile device to provide functions related to maintenance of the information related to the financial account. In other words, functions that can be performed by the mobile wallet server 410 through the service provider system 330, for example over the cellular or other wireless network, can include but are not limited to downloading and installing the mobile wallet application, updating balance information for the accounts stored therein, performing various transfers between those accounts, viewing transaction histories for the accounts, providing marketing messages, e.g., coupons and advertisements, redeeming coupons, etc. In some cases, depending upon the functions to be performed, the mobile wallet server 410 may make requests to the mobile commerce gateway 415. For example, in the case of determining a balance for a credit account, the mobile wallet server 410 may make a request to the mobile commerce gateway 415. Such a request can be routed by the mobile commerce gateway 415 to a payments system 312 or other acquirer system 312 which in turn makes a request to an issuing financial institution 316. It should be understood by one skilled in the art that the mobile wallet server may be implemented in various ways and operated by various entities. For example, the mobile wallet server 335 may be operated by the mobile service provider 330 and may be implemented as part of the systems operating the mobile network. In other cases, the mobile wallet server 335 may be operated by an acquirer and may be implemented as part of the acquirer systems 312.

Therefore, the gateway 415 can provide a common point or front-end through which other elements of the system 400 can interact with the various other acquirer systems 312. Stated another way, the gateway 415 can receive a communication, for example, related to a function of the mobile wallet application 408 of a mobile device 324. Receiving the communication can comprise receiving the communication from the mobile wallet server 335, from the merchant system 405, from the point-of-sale device 310, or from another acquirer system 312. One or more of the acquirer systems 312 for handling of the communication can be identified based on the function of the mobile wallet application 324 to which the communication relates. For example, the function can comprise a payment function, an account information lookup function, a registration function, a marketing function, a provisioning function, or another function. The communication can be routed by the gateway 415 to the identified one or more acquirer systems for handling of the communication. However, it is not required that all communications between elements of the system be routed or passed through the gateway 415. For example, the embodiment illustrated in FIG. 4 includes a reporting system or module 435 of the acquirer systems 312 that can be adapted to collect information on and generate reports of various transactions, users, etc. The reporting system 435 can be communicatively coupled with the service provider system 330, the merchant system 405 and/or other systems but without passing through or being routed by the gateway 415.

Figure 5:
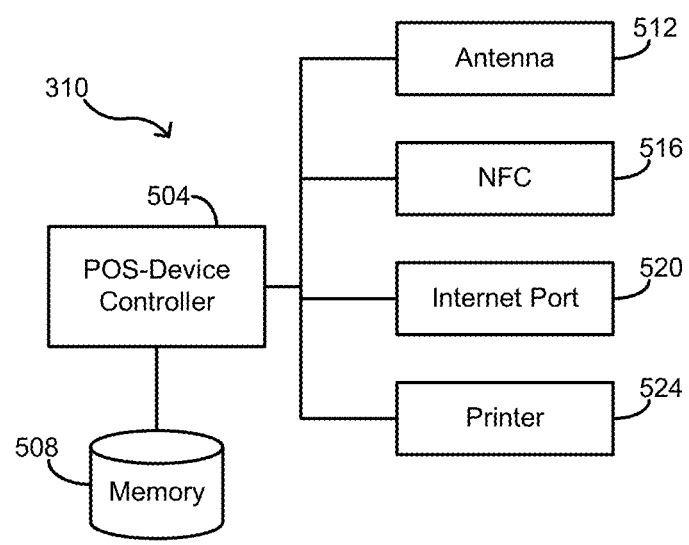
FIG. 5 is a block diagram illustrating components of an exemplary point of sale device that may be used with various embodiments of the present invention.

FIG. 5 is a block diagram illustrating components of an exemplary point of sale device that may be used with various embodiments of the present invention. Operations performed by the point-of-sale device 310 are generally coordinated by a controller 504, which is provided in electrical communication with a number of components. For example, the controller 504 can comprise a microprocessor or other computing device executing software stored, for example, in memory 508. Components with which the controller 504 is coupled can include an antenna 512 for transmitting and receiving electromagnetic signals and an NFC module 516 that provides instructions for implementing a communications protocol, such as an NFC protocol. The NFC module 516 performs a more active role than the antenna 512, determining what electromagnetic signals to transmit over the antenna 512 and/or interpreting electromagnetic signals that are received by the antenna 512. A port may be provided to permit the exchange of wired communications with the point-of-sale device 504, one example of the port being a TCP/IP port 520 that enables the point-of-sale device 504 to engage in Internet communications. A printer 524 interfaced with the controller 504 permits receipts and other documents to be printed by the point-of-sale device 504.

Figure 6:
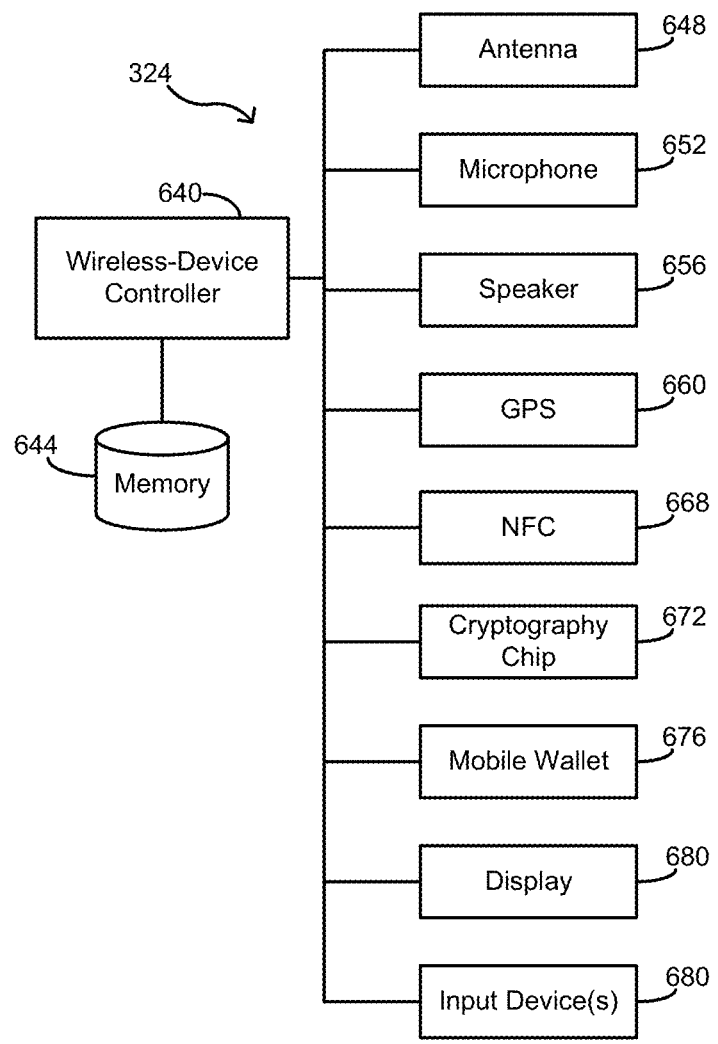
FIG. 6 is a block diagram illustrating components of an exemplary mobile device that may be used in various embodiments of the present invention.

FIG. 6 is a block diagram illustrating components of an exemplary mobile device that may be used with various embodiments of the present invention. The mobile device 324 includes a controller 640 which can comprise a microprocessor or other computing device executing software stored, for example, in memory 644 for coordinating the functions of a variety of components. Several of the components that may be controlled by the controller 540 include components used for standard functionality of the mobile device 324. For instance, in embodiments where the mobile device 324 is a cellular telephone, the controller may be interfaced with a microphone 652, a speaker 656, and an antenna 648. The microphone 652 and speaker 656 may be used to receive and amplify voice signals that are exchanged by users of the cellular telephone. The antenna 648 may be used to transmit and receive electromagnetic signals that correspond to encoded versions of the voice signals being exchanged.

Other components may include a global positioning system 660 that may be used to locate a position of the wireless device. Such a global positioning system 660 functions by transmitting an electromagnetic signal to an orbiting satellite that identifies a relative location of the source of the signal and correlates that relative position with a geographical map of a region of the Earth. An NFC module 668 may also be provided to encode and decode transmissions sent and received electromagnetically with the point of sale device as discussed above. Because transmissions involving the account information include sensitive financial data such as account numbers, a cryptography module 672 may also be provided to allow encryption of data sent and received by the mobile device 324 via the NFC module 668.

According to one embodiment, the mobile device 324 can also include a mobile wallet module or application 676. The mobile wallet 676 can be adapted to store payment vehicle information, i.e., information identifying one or more financial accounts such as credit accounts, debit accounts, demand deposit accounts, stored value accounts, etc. In some cases, the mobile wallet 676 can allow storage of multiple payment vehicles and can provide a user interface that can be displayed on a screen or display device 680 and through which the user can select a specific payment vehicle by manipulating a keypad, wheel, touch screen, or other input device 682. The mobile device 324, for example via the mobile wallet application 676, may allow the user to review accounts that are stored in the memory 644 of the mobile device 324 and select an account for a particular transaction such as a purchase. Upon selection of an account for use in the transaction, the user of the mobile device 324 can scan or swipe the device 624 in front of or near the POS device causing some or all of the information identifying the selected account to be read from the mobile device 324 via the NFC connection module 668.

Figure 7:
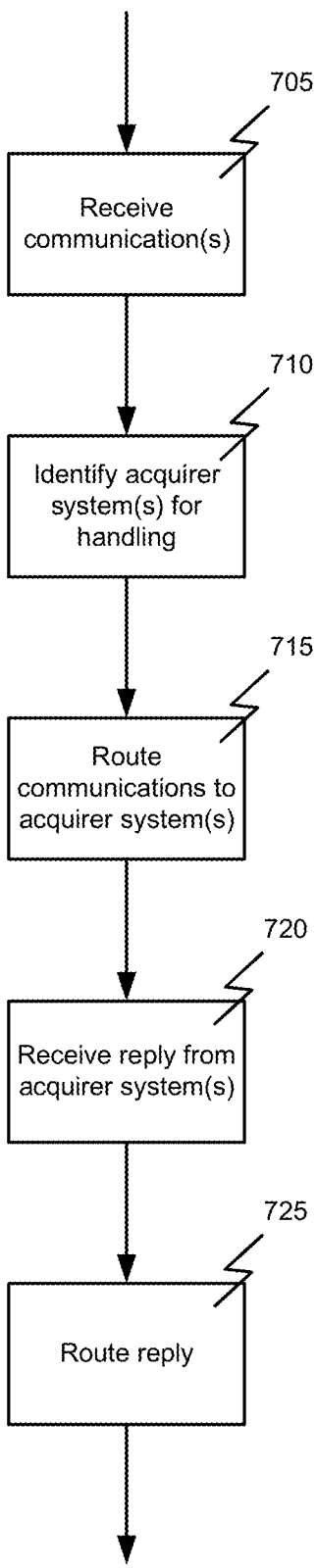
FIG. 7 is a flowchart illustrating a process for a mobile commerce gateway according to one embodiment of the present invention.

FIG. 7 is a flowchart illustrating a process for a mobile commerce gateway according to one embodiment of the present invention. In this example, the process begins with receiving 705 a communication related to a function of a mobile wallet application of a mobile device. As noted above, receiving 705 the communication can comprise receiving the communication from a mobile wallet server, from a merchant system, from a point-of-sale device, or from an acquirer system. One or more of a plurality of acquirer systems for handling of the communication can be identified 710 based on the function of the mobile wallet application to which the communication relates. For example, the function can comprise a payment function, an account information lookup function, a registration function, a marketing function, a provisioning function, or another function. The communication or information for the communication can be routed 715 to the identified one or more acquirer systems for handling of the communication. In some cases, a reply to the communication can be received 720 from at least one of the identified one or more acquirer systems and the reply can be sent 725 to a recipient. Sending 725 the reply to the recipient can comprise sending the reply to a mobile wallet server, a merchant system, a point-of-sale device, an acquirer system, or another system based on, for example, the type of function, information from the communication or the reply, or based on another criteria.

Figure 8:
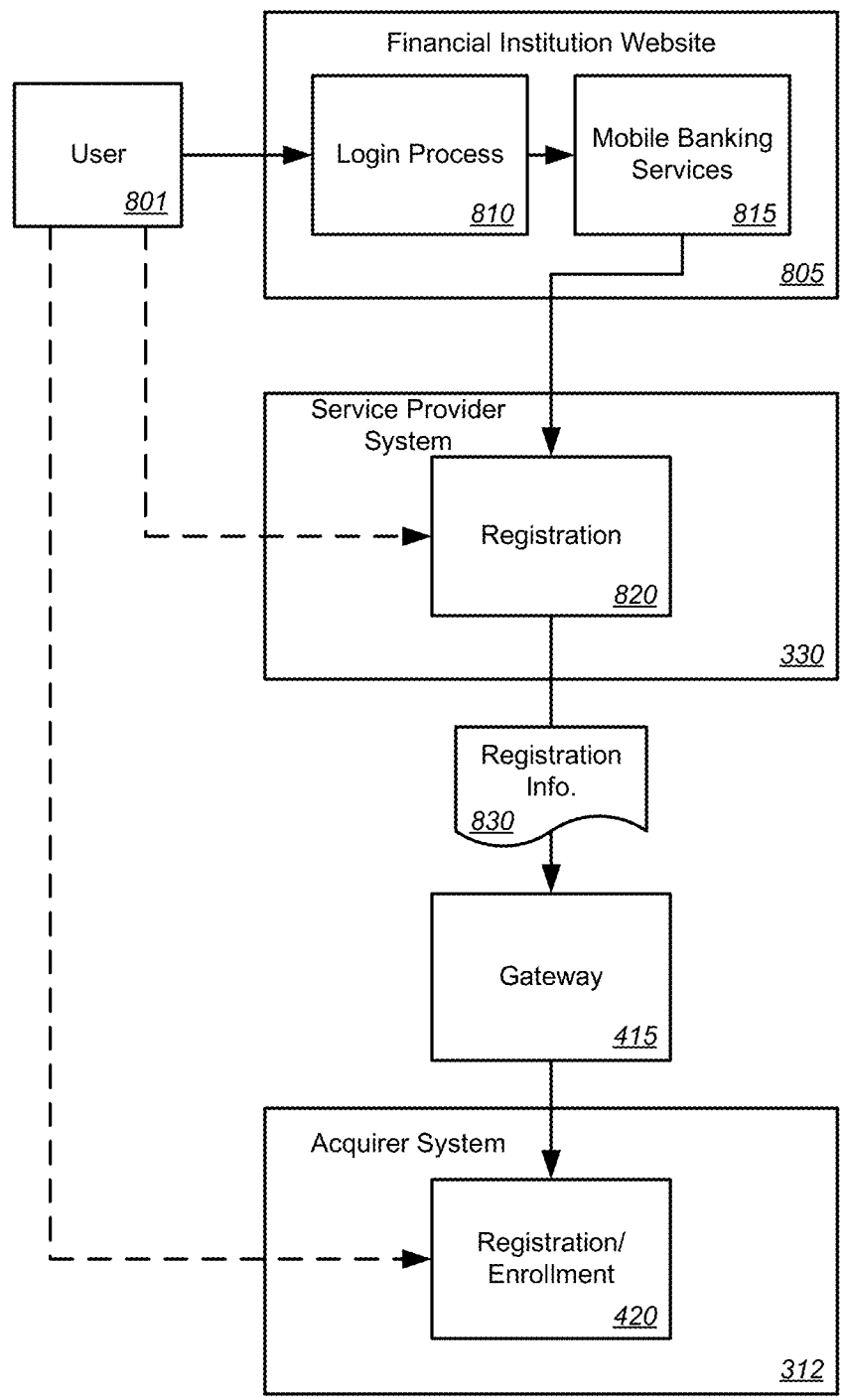
FIG. 8 is a block diagram illustrating elements of a mobile commerce system for enrollment and/or registration of a customer or device according to one embodiment of the present invention.

FIG. 8 is a block diagram illustrating elements of a mobile commerce system for enrollment and/or registration of a customer or device according to one embodiment of the present invention. According to one embodiment, a user 801 or consumer can enroll in a mobile commerce program via a web-based process of an enrollment server that can be provided as part of a service provider system 330, an acquirer system 312, via a participating bank or other financial institution website 805, or other entity or combination thereof.

For example, the user 801 can, via log in process 810, access a mobile banking website or web service 815 such as provided by a participating bank or other financial institution. If the user 801 is a customer of a participating bank, the user 801 can begin the registration process at the bank's website 815, for example, by clicking on a hot-link to a service provider such as a wireless service provider for the user's mobile device. This action can cause the user 801 to be redirected to the service provider system 330 and/or can initiate a communication between the bank and the service provider system 330 though which enrollment information can be exchanged.

The service provider system 330 can include a registration process 820 or module for determining whether to allow registration of the user and/or the device and to possibly provide opportunities for the user to purchase or upgrade his service if it does not currently qualify for use with the mobile commerce system. For example, if the consumer 801 is not a current customer of the service provider, the user can be given the opportunity to purchase a plan and possibly a mobile device. For a current customer of the service provider, a validation can be conducted to determine whether the mobile wallet can be provisioned to the user's mobile device, i.e., whether the device qualifies or is suitable for use with the mobile wallet application. For example, the user may be queried by the registration process 820 as to what device will be used. Alternatively, the service provider system may maintain an indication of the current device of the user. The indicated device can be compared to a list of approved or acceptable devices for use with the system maintained or accessible by the registration process 820. Additionally or alternatively, a validation can be conducted to determine whether the customer's data plan qualifies. That is, an indication of the user's current data plan can be received from the user or read from information maintained by the service provider. This information can be compared to a list of approved plans that are indicated to be acceptable for use with the system. A plan can be deemed acceptable based on any of a number of criteria such as available data transfer rates or limits, contractual limitations of the service, or any other technical or business criteria. If the plan is determined to not be acceptable for use with the system, the user can be given the opportunity to purchase one or upgrade the current plan.

Upon validation, purchase, and/or upgrade of the user's device and/or plan, the user 801 can be redirected or transferred to an acquirer system 312 such as an enrollment host 420 via a hot-link or via other programmatic means (i.e., a button). According to one embodiment, the service provider system 330 can provide to the acquirer system 312, for example via the gateway 415 as described above, a data set consisting of enrollment data collected from the user. Such enrollment data can include but is not limited to name, cellular number, mobile device type, etc. The registration information can be stored by the service provider system 330 and/or the acquirer system 312 for later use.

The user 801 can be given additional details about the program in which they are enrolling by the acquirer system 312. Additionally or alternatively, participating merchants may have marketing messages and offers on the site. In some cases, the user 801 may be asked to "opt-in" or "opt-out" to receive such marketing messages. Additionally or alternatively, through the acquirer system 312, the consumer 801 can review and edit their registration data and/or preferences, register their prepaid cards (e.g., with participating merchants), and/or perform other functions.

Stated another way, the mobile commerce system can comprise a mobile device and a service provider system 330 adapted to receive a registration request from a user of the mobile device. For example, the service provider system 330 can be adapted to receive the registration request from the user 801 of the mobile device via a web service 815 of a financial institution 805. In another example, the service provider system 330 can be adapted to provide a registration web service 820. In such a case, receiving the registration request from the user 801 of the mobile device can comprise receiving the registration request via the registration web service 820 of the service provider system 330.

The service provider system 330 can be adapted, for example via the registration service or process 820, to determine whether to allow registration of the mobile device. For example, the service provider system 330 can determine whether to allow registration of the mobile device by determining whether the user of the mobile device is a current wireless service subscriber. Additionally or alternatively, the service provider system 330 can determine whether to allow registration of the mobile device by determining whether the mobile device qualifies for use in the mobile commerce system. Additionally or alternatively, the service provider system 330 can determine whether to allow registration of the mobile device by determining whether a data service plan of the user of the mobile device qualifies for use in the mobile commerce system. As noted above, at any point during this process, if a determination is made that the user's device or plan does not qualify for use in the mobile commerce system, the user may be given opportunities to purchase or upgrade the device and/or plan in order to qualify.

The system can also include an acquirer system 312 communicatively coupled with the service provider system 330, for example via the gateway 415. The service provider system 330 can be further adapted to, in response to determining to allow registration of the mobile device, send the registration information 830 from the service provider system 330 to an acquirer system 312. The acquirer system 312, for example the registration or enrollment host or process 420, can in turn be adapted to provide user information related to the mobile commerce system. Additionally or alternatively, the acquirer system 312 can be adapted to maintain a set of personal information of the user. In some cases, the acquirer system 312 can be adapted to maintain a set of user preferences for the user. For example, the user preferences can include an indication of whether the user has elected to receive marketing messages, i.e., opt-in or opt-out preferences. Additionally or alternatively, the acquirer system 312 can be adapted to register one or more stored value or other accounts of the user for use in the mobile commerce system.

Figure 9:
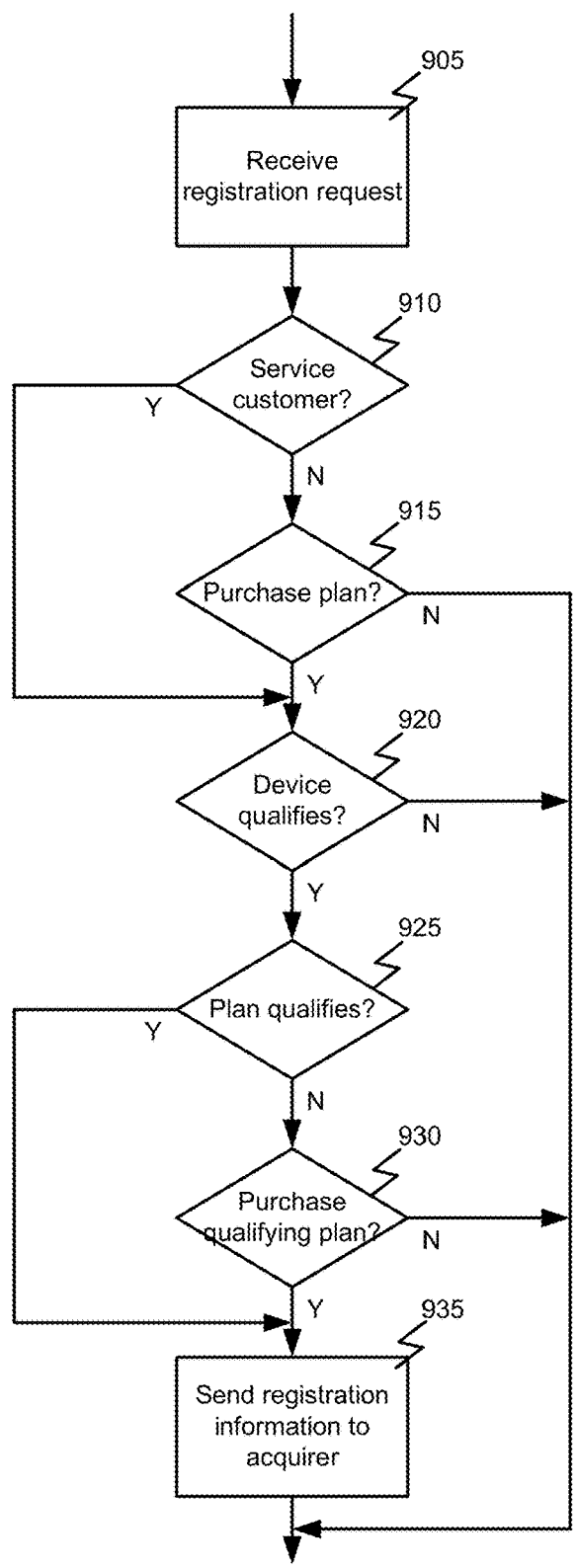
FIG. 9 is a flowchart illustrating a process for enrollment and/or registration of a customer or device in a mobile commerce system according to one embodiment of the present invention.

FIG. 9 is a flowchart illustrating a process for enrollment and/or registration of a customer or device in a mobile commerce system according to one embodiment of the present invention. In this example, the process begins with receiving 905 a registration request from a user of the mobile device. For example, receiving 905 the registration request from the user of the mobile device can comprise receiving the registration request at a service provider system from a mobile commerce web service of a financial institution. In another example, receiving 905 the registration request from the user of the mobile device can comprise receiving the registration request via a web service of the service provider system.

Determinations 910-930 can be made with the service provider system whether to allow registration of the mobile device. Generally speaking, in response to determining 910-930 to allow registration of the mobile device, the registration request can be sent 935 from the service provider system to an acquirer system.

More specifically, in this example, determining 910-930 whether to allow registration of the mobile device can comprise determining 910 whether the user of the mobile device is a current wireless service subscriber. In response to determining the user is not a current subscriber, the user can be given an option 915 to subscribe. If 915 the user chooses to become a subscriber, a determination 920 can be made as to whether the mobile device qualifies for use in the mobile commerce system. If 920 the user's device qualifies, a determination 925 can be made as to whether a data service plan of the user of the mobile device or other plan, service, package, application, etc., that is deemed appropriate or qualifies for use in the mobile commerce system as designated by the carrier or service provider. If 925 the data plan or other plan of the user qualifies, i.e., the plan is designated by the service provider as applicable to the mobile commerce system based on any of a number of technical and/or contractual criteria, the registration information can be sent 935 to the acquirer systems. If 925 the data service plan of the user does not qualify, the user can be given an option 930 to purchase or upgrade to a data plan designated as suitable for the mobile commerce system. If 930 the user chooses to purchase or upgrade to a qualifying data plan, the registration information can be sent 935 to the acquirer systems.

Figure 10:
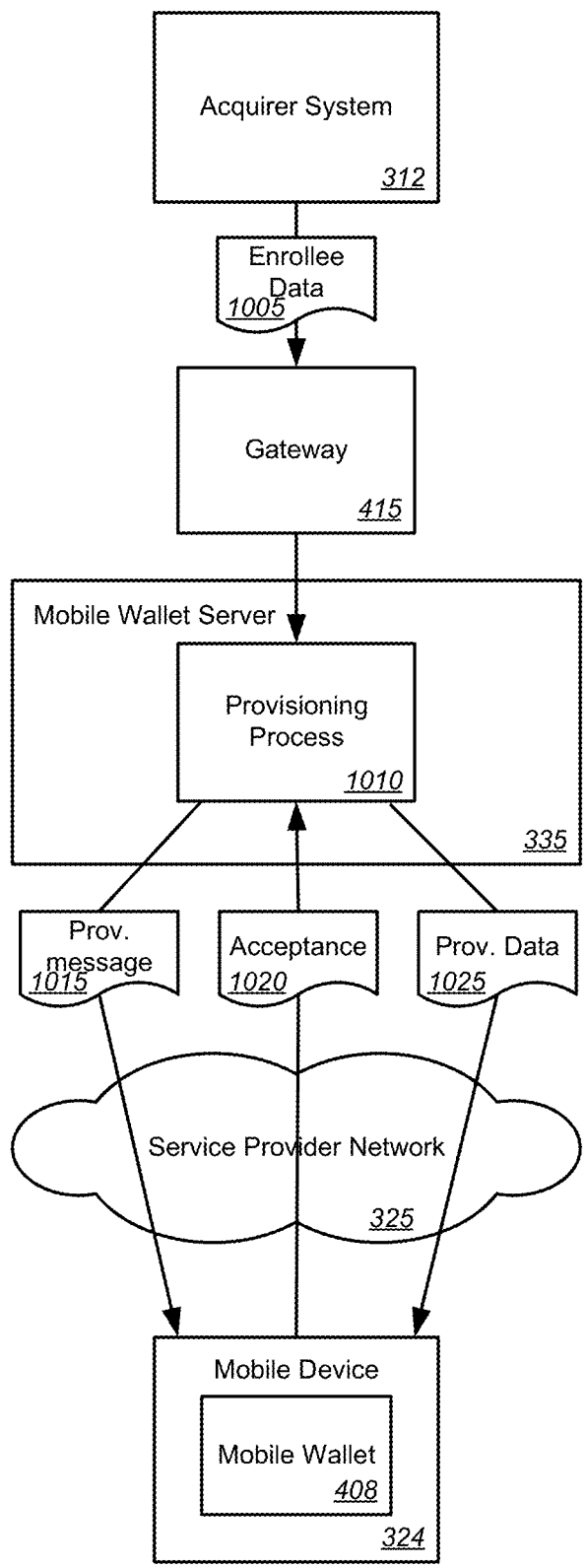
FIG. 10 is a block diagram illustrating elements of a mobile commerce system for provisioning a mobile wallet according to one embodiment of the present invention.

FIG. 10 is a block diagram illustrating elements of a mobile commerce system for provisioning a mobile wallet according to one embodiment of the present invention. According to one embodiment, the acquirer system 312 can upload the enrollee's (i.e., the consumer's or registrant's) data 1005 and mobile device specifications to a mobile wallet server 410 for example, via the gateway 415 as described above. The mobile wallet server 335, for example via provisioning process 1010, can process the data and create the mobile wallet or other data to be provisioned to the mobile wallet. The mobile wallet server 335 can then provide a link to the consumer's mobile device 324, for example via a provisioning message 1015 such an SMS message or email message, over the service provider's network 325 so that downloading of the wallet may begin. Upon the consumer accessing the link from the mobile device 324 and/or choosing to download the wallet, an acceptance message 1020 can be sent to the mobile wallet server 335. The acceptance message 1020 can include a credential or other information identifying the user of the mobile device 324. The mobile wallet server 335 can in turn authenticate the user based on the acceptance message 1020. Upon authentication of the consumer, the wallet application or other data 1025 can be uploaded/provisioned from the mobile wallet server 335 to the mobile device 324 via the service provider network 325.

Stated another way, a mobile commerce system can comprise a mobile device 324 and an acquirer system 312 adapted to provide a set of registration information 1005 for the mobile device 324. A mobile wallet server 335 can be communicatively coupled with the acquirer system 312 and can be adapted to receive the registration information 1005 for the mobile device 324 from the acquirer system 312, determine based on the registration information 1005 whether the mobile wallet 408 of the mobile device 324 has been previously provisioned, and in response to determining that the mobile wallet 324 of the mobile device 324 has not been previously provisioned, create a new mobile wallet for the mobile device 324 and send a notification 1015 such as an SMS or email message from the mobile wallet server 335 to the mobile device 324, the notification 1015 indicating the mobile wallet is available for download. The mobile wallet server 335 can be further adapted to retrieve a stored set of previously provisioned mobile wallet information for the mobile device 324 and send the set of previously provisioned mobile wallet information to the mobile device in response to determining that the mobile wallet 408 of the mobile device 324 has been previously provisioned. For example, in the event the user needs to reload or re-provision a device, a previously provisioned and saved wallet can be retrieved and provisioned to the device. Once again, a notification message 1015 can be sent to the mobile device 324 to indicate that the data is available for download.

The mobile wallet server 335 can be further adapted to receive a response or acceptance message 1020 from the mobile device 324. The mobile wallet server 335 can be adapted to authenticate a user of the mobile device 324 based on the response 1020. In response to authenticating the user of the mobile device 324, the mobile wallet server 335 can download the mobile wallet or other data 1025 to the mobile device 324.

Figure 11:
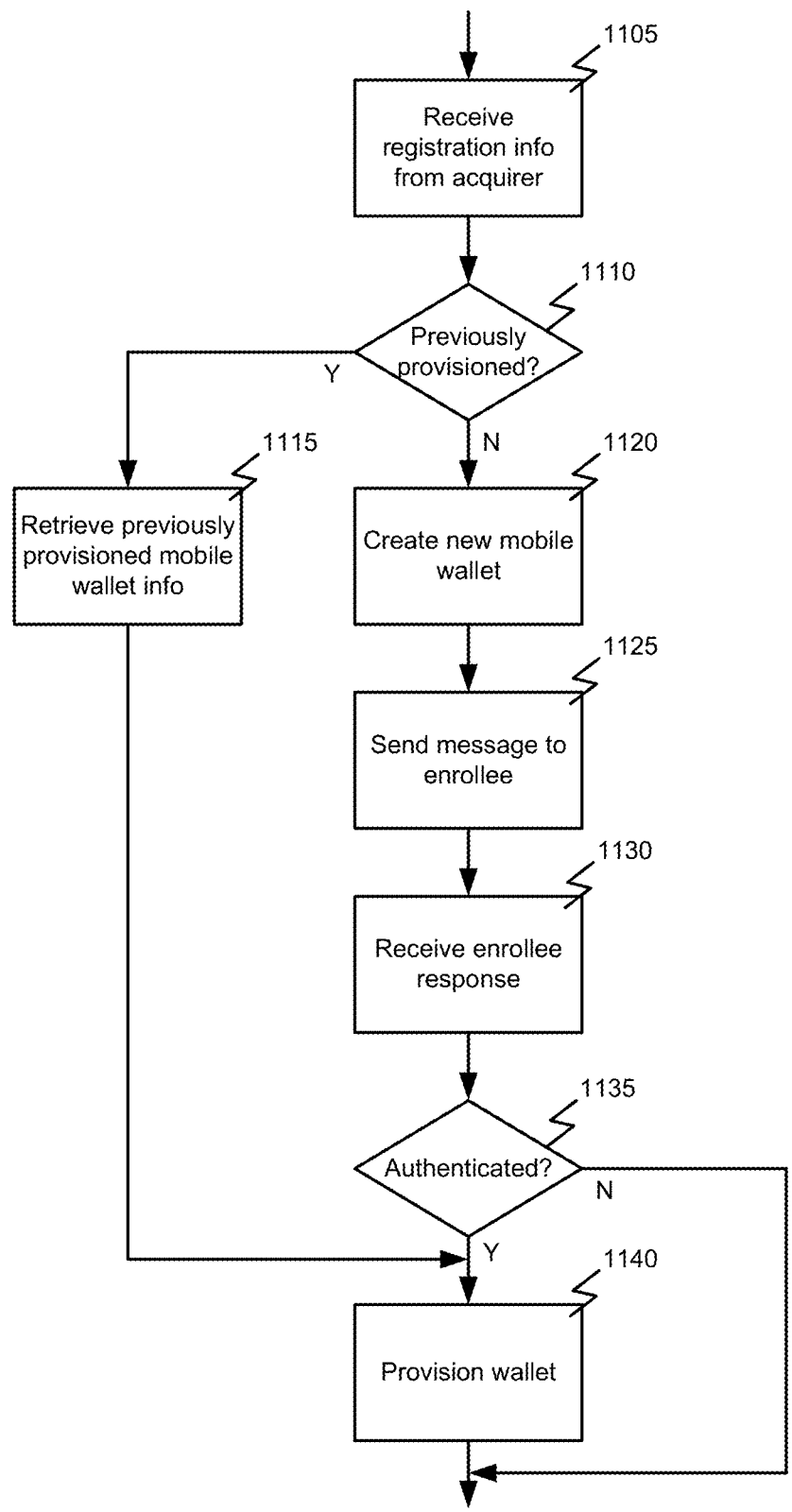
FIG. 11 is a flowchart illustrating a process for mobile wallet provisioning according to one embodiment of the present invention.

FIG. 11 is a flowchart illustrating a process for mobile wallet provisioning according to one embodiment of the present invention. In this example, the process can begin with receiving 1105 at a mobile wallet server registration information for the mobile device from an acquirer system. A determination 1110 can be made based on the registration information as to whether the mobile wallet of the mobile device has been previously provisioned. In response to determining 1110 that the mobile wallet of the mobile device has been previously provisioned, a stored set of previously provisioned mobile wallet information for the mobile device can be retrieved 1115 and sent 1140 to the mobile device from the mobile wallet server.

In response to determining 1110 that the mobile wallet of the mobile device has not been previously provisioned, a new mobile wallet can be created 1120 for the mobile device. A notification can then be sent 1125 from the mobile wallet server to the mobile device. The notification can comprise, for example, a Short Message Service (SMS) message, an email message, or other type of message, and can indicate the mobile wallet is available for download. A response can be received 1130 at the mobile wallet server from the mobile device. A user of the mobile device can be authenticated 1135 based on the response. In response to authenticating 1135 the user of the mobile device, the mobile wallet can be downloaded 1140 from the mobile wallet server to the mobile device. Downloading 1140 the mobile wallet from the mobile wallet server to the mobile device can be performed via a wireless communications network such as a cellular network.

Figure 12:
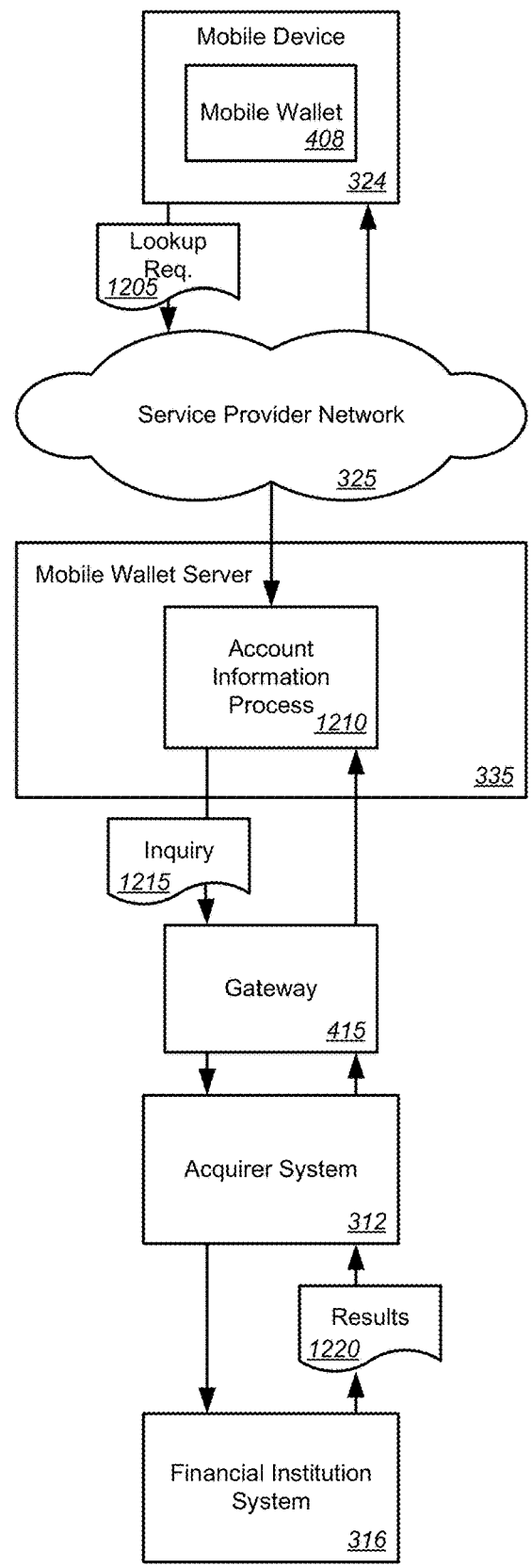
FIG. 12 is a block diagram illustrating elements of a mobile commerce system for performing account information lookup according to one embodiment of the present invention.

FIG. 12 is a block diagram illustrating elements of a mobile commerce system for performing account information lookup according to one embodiment of the present invention. After enrollment/registration and mobile wallet provisioning are completed as described above, the consumer can request account information lookup/refresh (for example a balance or transaction history for a registered stored-value account or other account) via the mobile device 324. As illustrated in this example, the user can access the mobile wallet 408 on the mobile device 324 and executes the account information lookup function 1005. The request can be passed to the mobile wallet server 410 via the service provider network 325. According to one embodiment, the request may include an identity credential or other information for authenticating or otherwise verifying the user and/or device by any or all of the elements of the system. The mobile wallet server 410, for example via an account information process or module 1210, can generate and send an inquiry 1215, for example, via the gateway 415 as described above, to the acquirer system 312 to request a balance or transaction history. The acquirer system 312 can look up and respond with results 1220 such as balances, histories, or error codes. The results 1220 can be passed back to the mobile wallet server 335, for example via the gateway 415. The mobile wallet server 335 can in turn update the mobile wallet 408 on the mobile device 324 via the service provider network 325.

Stated another way, a mobile commerce system can comprise a wireless communications network 325 such as a cellular network and a mobile device 324 communicatively coupled with the wireless communications network 325. The mobile device 324 can be adapted to execute a mobile wallet application 408. The mobile wallet application 408 can include information identifying a financial account. The mobile wallet application 408 can be adapted to request 1205 account information for the financial account. For example, the account information can comprise an account balance. In another example, the account information can comprise an account transaction history.

The system can also include an acquirer system 312 adapted to access account information for a plurality of financial accounts and a mobile wallet server 335 communicatively coupled with the wireless communications network 325 and the acquirer system 312. The mobile wallet server 335 can be adapted to receive the request 1205 for the account information from the mobile wallet 408 of the mobile device 324 via the wireless communications network 325. The request 1205 for account information can include information identifying the financial account. For example, the information identifying the financial account can comprise an account number. In another example, the mobile wallet server 335 can be adapted to determine an account number of the financial account based on the information identifying the financial account.

The mobile wallet server 335 can send an account inquiry 1215 to the acquirer system 312. In some cases, the account inquiry 1215 can include the information identifying the financial account. In such cases, the acquirer system 312 can be adapted to determine an account number of the financial account based on the information identifying the financial account. The mobile wallet server 335 can receive the account information 1220 from the acquirer system 312 and send the account information 1220 to the mobile wallet 408 of the mobile device 324 via the wireless communications network 325.

Figure 13:
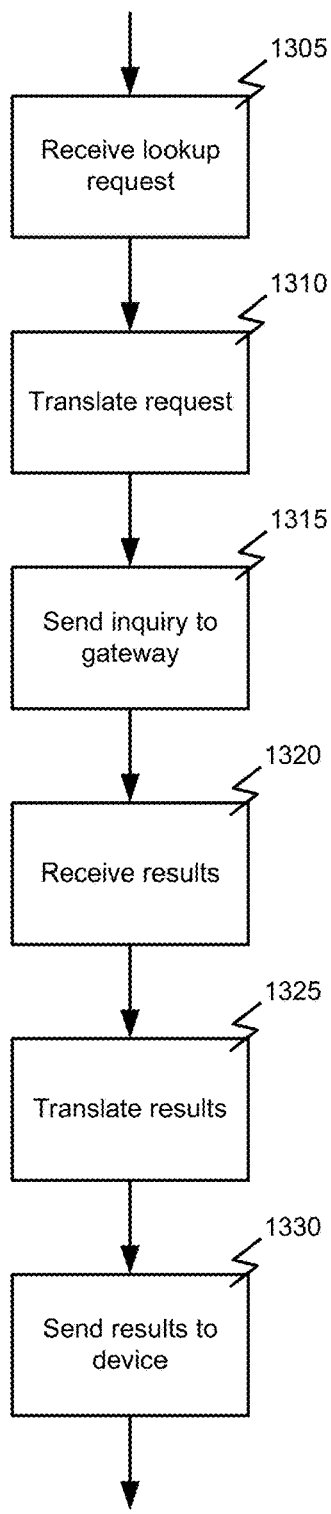
FIG. 13 is a flowchart illustrating a process for performing account information lookup according to one embodiment of the present invention.

FIG. 13 is a flowchart illustrating a process for performing account information lookup according to one embodiment of the present invention. In this example, the process begins with receiving 1305 at a mobile wallet server a request for the account information. For example, the account information can comprise an account balance. In another example, the account information can comprise an account transaction history. Receiving 1305 the request for the account information can be performed via a wireless communications network such as a cellular network.

The request for account information can include information identifying the financial account. For example, the information identifying the financial account can comprise an account number. In another example, an account number of the financial account can be determined based on the information identifying the financial account. Thus, the request can be translated 1310 to determine and indicate the account number and/or place the request into a format readable by the acquirer system.

An account inquiry can be sent 1315 from the mobile wallet server to an acquirer system. The account information can be received 1320 at the mobile wallet server from the acquirer system. The results can be translated 1325 for delivery to the mobile device. For example, translation can include encrypting the results and/or placing them into a message such as an SMS, email, or other format message for transmission and delivery to the mobile device. The results can then be sent 1330 from the mobile wallet server to the mobile wallet of the mobile device. Sending 1330 the account information from the mobile wallet server to the mobile wallet of the mobile device can be performed via a wireless communications network such as a cellular network.

Figure 14:
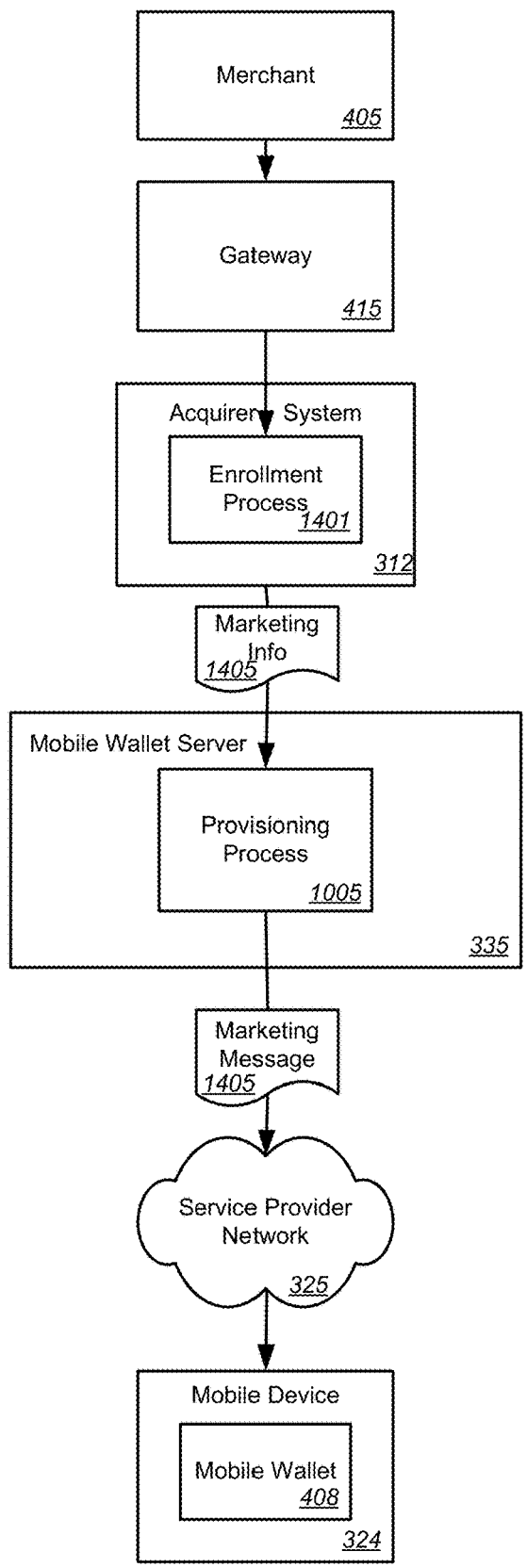
FIG. 14 is a block diagram illustrating elements of a mobile commerce system for providing marketing messages according to one embodiment of the present invention.

FIG. 14 is a block diagram illustrating elements of a mobile commerce system for providing marketing messages according to one embodiment of the present invention. In this example, an acquirer 312 and participating merchants 405 (including possibly the provider of the mobile communications service, banks, other financial institutions, etc.) can create marketing messages via, for example, the acquirer's loyalty host as described above. Alternatively, a dedicated marketing management system may be used. These messages can be sent or provisioned to the mobile wallet 408 inbox via the mobile wallet server 335, for example as described above with reference to FIGS. 10 and 11, to those registrants who chose to 'opt-in' to mobile marketing from consumer selected merchants. These messages may include (but are not limited to) special offers, discounts, and other offers to enrollees/participants of this program. Additionally or alternatively, the messages may include new product information, commercials, or other messages delivered via streaming video, audio, text, or in another format.

For example, a participating merchant 405 can create a mobile marketing campaign by accessing the acquirer system 312, for example via the gateway 415 or a web service, and initiating an enrollment process 1401. The acquirer system 312, for example via a loyalty host, a dedicated marketing management system, or other system, can record the registration information such as identifying information for the merchant, offer information, demographic information indicating consumers to which the marketing messages should be directed, and possibly other information. The acquirer system 312 can deploy the marketing information 1405 to those registrants who selected to 'opt-in' to this merchant's marketing program via the mobile wallet server 335. The mobile wallet server 335 for example via the provisioning process described above, can provision the marketing message 1405 to the inbox of the mobile wallet 408 on the consumer's mobile device 324 via the service provider network 325.

Stated another way, a system can comprise a wireless communications network 325, such as a cellular network, and a plurality of mobile devices 324 communicatively coupled with the wireless communications network 325. Each mobile device 325 can be adapted to execute a mobile wallet application 408. The system can also include an acquirer system 312 adapted to generate a set of information 1405 identifying one or more marketing offers. A mobile wallet server 335 can be communicatively coupled with the wireless communications network 325 and the acquirer system 312. The mobile wallet server 335 can be adapted to receive the set of information 1405 identifying the one or more marketing offers from the acquirer system 312, generate one or more marketing messages 1405 based on the set of information identifying the one or more marketing offers, and send each of the one or more marketing messages 1405 to the mobile wallet application 408 of one or more mobile devices 324 via the wireless communications network 325. For example, the marketing messages 1405 can comprise Short Message Service (SMS) messages, email messages, or other types of messages.

The acquirer system 312 can generate the set of information 1405 identifying the one or more marketing offers based on a selection of one or more predefined marketing offers by a participating merchant 405 or other marketing entity. Additionally or alternatively, the acquirer system 312 can generate the set of information 1405 identifying the one or more marketing offers based on information provided to the acquirer system 312 from a marketing entity such as a merchant 405. In some cases, the acquirer system 312 can be further adapted to determine one or more recipients for the marketing offers. In such cases, the acquirer system 312 can be adapted to determine one or more recipients for the marketing offers based at least in part on preference information for the one or more recipients.

Additionally or alternatively, the mobile wallet server 335 can be further adapted to determine one or more recipients for the marketing offers. For example, the mobile wallet server 335 can be adapted to determine one or more recipients for the marketing offers based at least in part on the set of information identifying the one or more marketing offers. Additionally or alternatively, the mobile wallet server 335 can be adapted to determine one or more recipients for the marketing offers based at least in part on a preference information for the one or more recipients, e.g., based on opt-in/opt-out or other preference information.

Figure 15:
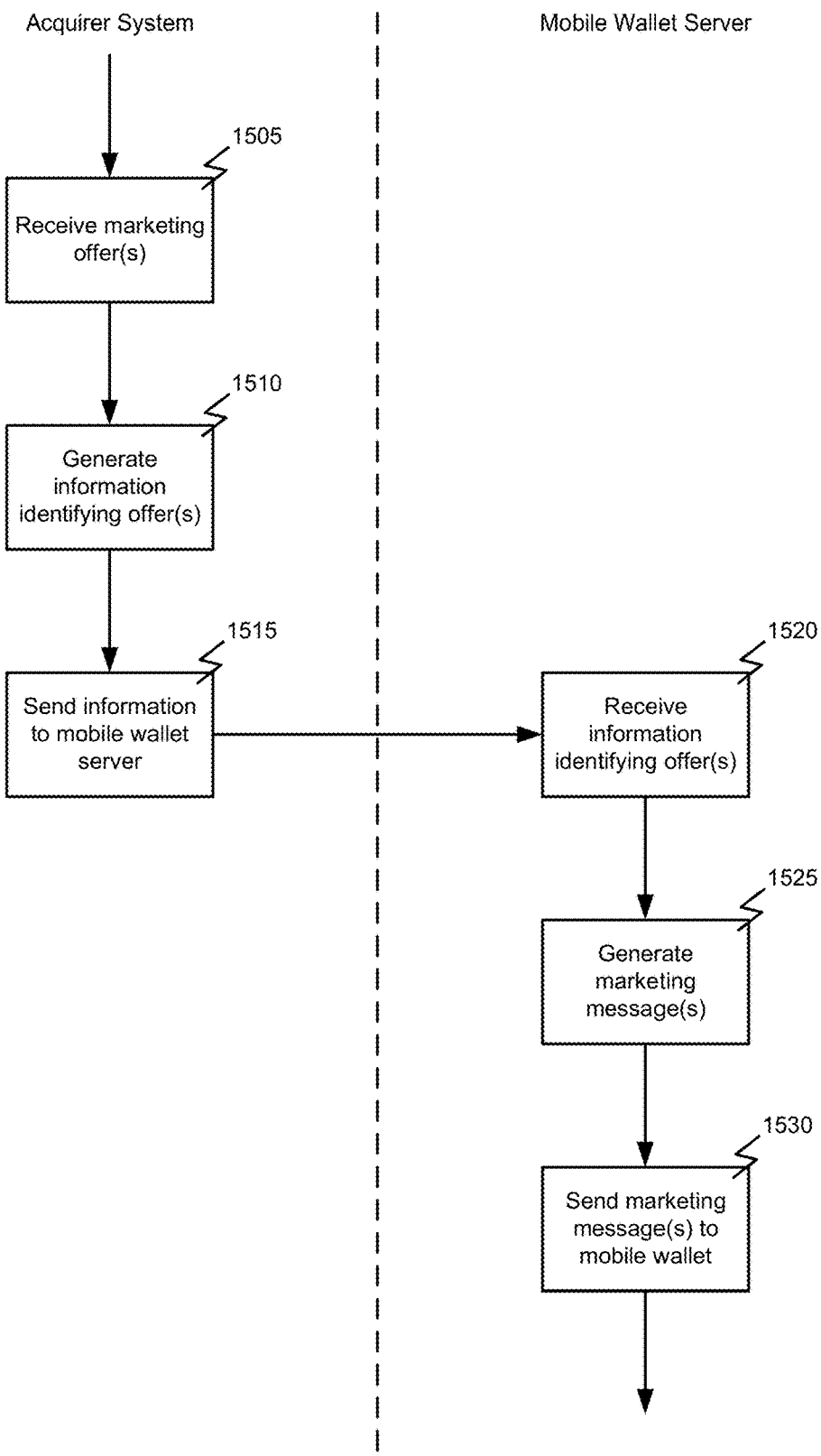
FIG. 15 is a flowchart illustrating a process for providing marketing messages in a mobile commerce system according to one embodiment of the present invention.

FIG. 15 is a flowchart illustrating a process for providing marketing messages in a mobile commerce system according to one embodiment of the present invention. In this example, the process begins with receiving 1505 at the acquirer system one or more indications of marketing offers from a marketing entity such as a participating merchant. Based on this information, the acquirer system can generate 1510 a set of information identifying the one or more marketing offers. Generating 1510 the set of information identifying the one or more marketing offers can be based on a selection of one or more predefined marketing offers by the participating merchant or other marketing entity. Additionally or alternatively, generating 1510 the set of information identifying the one or more marketing offers can be based on information provided to the acquirer system from the marketing entity. In some cases, generating 1510 the set of information identifying the one or more marketing offers can comprise determining with the acquirer system one or more recipients for the marketing offers. For example, determining one or more recipients for the marketing offers can be based at least in part on a preference information for the one or more recipients. The set of information identifying the one or more marketing offers can then be sent 1515 to the mobile wallet server.

The mobile wallet server can receive 1520 the set of information identifying the marketing offers from the acquirer system. The mobile wallet server can the generate 1525 one or more marketing messages based on the information from the acquirer system. In some cases, generating 1525 the marketing messages can comprise determining with the mobile wallet server one or more recipients for the marketing offers. In such a case, determining one or more recipients for the marketing offers can be based at least in part on the set of information identifying the one or more marketing offers. Additionally or alternatively, determining one or more recipients for the marketing offers can be based at least in part on a preference information for the one or more recipients. In any event, one or more marketing messages can be generated 1525 by the mobile wallet server based on the set of information identifying the one or more marketing offers. For example, the marketing messages can comprise Short Message Service (SMS) messages, email messages, audio, video, an executable applet or application, or other types of messages. Each of the one or more marketing messages can be sent 1530 from the mobile wallet server to one or more mobile devices.

Figure 16:
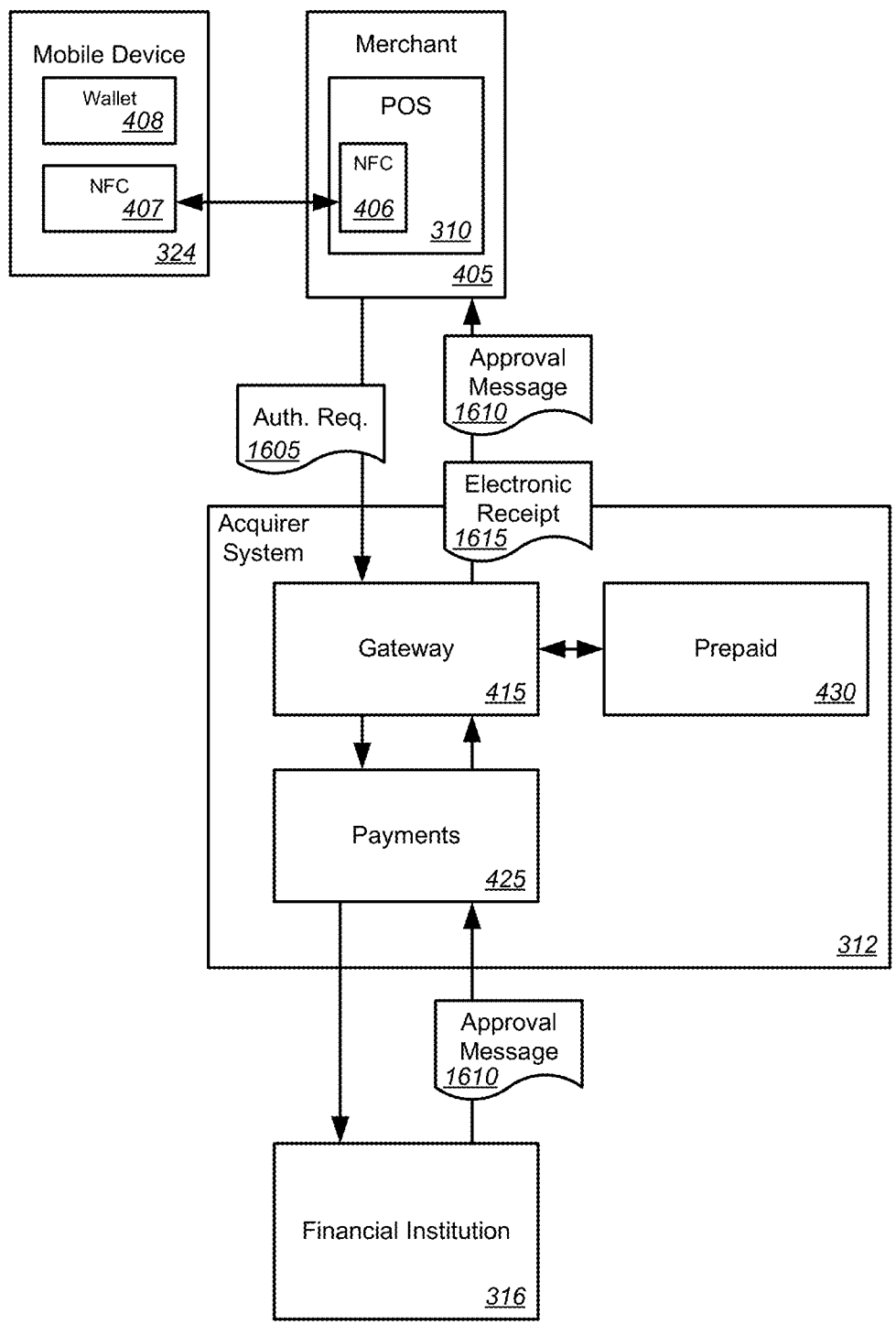
FIG. 16 is a block diagram illustrating elements of a mobile commerce system for handling payment transactions according to one embodiment of the present invention.

FIG. 16 is a block diagram illustrating elements of a mobile commerce system for handling payments according to one embodiment of the present invention. As illustrated here, the system can comprise a mobile device 324 including a Near Field Communications (NFC) transponder 407 and a mobile wallet application 408. The mobile device 324 can be adapted to maintain at least one set of information related to a financial account in the mobile wallet 408 and, upon initiation of a transaction such as a sale or payment, communicate at least a subset of the information related to the financial account via the NFC transponder 408, for example to an NFC transponder of a POS device 310 of a merchant system 405 as described above. In some cases, the mobile wallet 408 of the mobile device 324 can maintain information related to a plurality of financial accounts such as, for example, debit accounts, demand deposit accounts, stored value accounts, loyalty accounts under a customer loyalty program, etc. In such cases, the mobile wallet 408 of the mobile device 324 can be adapted to present the plurality of financial accounts to a user of the mobile device 324 and receive a selection of a financial account for the transaction. The mobile device 324 can be adapted to communicate at least a subset of the information related to the selected financial account via the NFC transponder 324 upon initiation of the transaction. According to one embodiment, the communication may include an identity credential or other information for authenticating or otherwise verifying the user and/or device by any or all of the elements of the system.

The POS device 310 can be adapted to receive the information related to the financial account from the mobile device 324 via the NFC transponder 406 and send a communication related to the transaction, i.e., an authorization request 1605 to the acquirer systems 312. The communication related to the financial transaction can include the information related to the financial account. Additionally, the request may include any identity credential or other information for authenticating or otherwise verifying the user and/or device that may be provided by the mobile device 324.

As noted above, the mobile commerce gateway 415 can be adapted to receive the authorization request 1605 related to the transaction from the point of sale device 310 and route the communication for handling of the transaction based on the information related to the financial account.

As described above, for example with reference to FIG. 4, the system can also include a plurality of acquirer systems communicatively coupled with the mobile commerce gateway 415. Each of the acquirer systems can be adapted to perform functions related to at least one type of financial transaction. For example, the acquirer systems 312 can include but are not limited to a payments system 425 adapted to communicate with a financial institution 316 maintaining the financial account. The payment system 425 can be adapted to route the authorization request 1605 to the financial institution 316 maintaining the account for authorization of the transaction. The payment system 425 can receive an approval message 1610, or conversely a denial message, from the financial institution indicating approval or denial of the transaction. The payment system 425 can in turn send the approval message 1610 to the POS device 310, for example via the gateway 415.

According to one embodiment, the approval message 1610 may comprise an electronic receipt. That is, the approval message 1610 can include information related to completion of the transaction such as a dollar amount, time, date, payee information, and/or other information useful to a user of the mobile device 324 to identify, record, and/or track the transaction. In such a case, the POS device 310 may be adapted to receive the approval message 1610 from the acquirer system 312 and pass the approval message 1610 to the mobile device 324 via the NFC transponders 406 and 407 to be stored in or by the mobile wallet 408 of the mobile device 324.

Alternatively, a separate electronic receipt 1615 may be generated by the financial institution 316, the payments system 425, or other acquirer system in addition to the approval message 1610 provided by the financial institution 316. In such a case, the POS device 310 may be adapted to receive the electronic receipt 1615 from the acquirer system 312 and pass the electronic receipt 1615 to the mobile device 324 via the NFC transponders 406 and 407 to be stored in or by the mobile wallet 408 of the mobile device 324. Additionally or alternatively, the POS device 310 can be adapted to modify an electronic receipt provided by another system such as one of the acquirer systems. For example, the POS device 310 can be adapted to add transaction specific information such as items purchased, price per items, etc. to the receipt. In other implementations, the POS device 310 may generate a separate electronic receipt that can include information provided to the POS device 310 via the approval message 1610 or electronic receipt 1615 from the acquirer systems as well as transaction specific information such as items purchased, price per items, etc.

Regardless of how or where the electronic receipt is generated, it can be passed to the mobile wallet of the mobile device via the NFC module of the POS device 310, the gateway 415, or other acquirer system 312 via the mobile wallet server 335 described above, or via another channel. According to one embodiment, the electronic receipt can be provisioned to the mobile device over the air. For instance, a message can be sent from the POS device 310 and/or merchant system 405 to the mobile wallet server 335 described above. This message can include an identifier available to systems in the chain of creating and providing the receipt. For example, the POS device 310 can acquire the mobile device's unique identifier e.g., phone number, device identifier, device address, etc. via the NFC module of the POS device 310, by input to the POS device 310 by the user of the mobile device, or in another manner. Alternatively or additionally, the gateway or other acquirer system could determine the identifier for the device, for example from data maintained by an enrollment system 420 as described above. This identifier can then be used to address or identify and route the receipt to the mobile device via the mobile wallet server 335 and/or service provider system 330 as described above. In yet another alternative, the receipt may be passed to another device or computer, other than the mobile device. For example, based on preference or other information of the user which can be maintained by the enrollment server 420 or another system, the gateway 415 or other acquirer system can send the send the receipt to the users personal computer or other device. In such cases, the receipt can later be synchronized or transferred to the wireless device via a USB, wireless, or other connection.

Once the mobile wallet has received a receipt, the mobile wallet 408 can also be adapted to provide an interface for the user of the mobile device to later view, delete, or otherwise manage electronic receipts. Additionally or alternatively, the mobile wallet 408 of the mobile device 324 can be adapted to sync or transfer the electronic receipts to another device and/or application such as a spreadsheet or financial management application on the user's personal computer. Additionally or alternatively, the mobile wallet 408 of the mobile device 324 can be adapted to provide the receipt or a copy of the receipt, either through a user interface, via the NFC transponder of the mobile device, or in another manner. So, for example, the electronic receipt, once in the mobile wallet 408 can be used to make returns of merchandise, for example by the user of the mobile device selecting the receipt from the wallet and swiping or scanning the mobile device near the NFC transponder of the POS device. The merchant can then use the electronic receipt to process a return. In such a case, the electronic receipt may contain encrypted information supplied by the merchant prior to or during generation of the receipt in order to verify the origin, contents, and/or authenticity of the receipt and prevent tampering with the contents of the receipt.

It should be noted that, other acquirer systems as described above may be utilized to authorize a transaction. That is, the second acquirer systems can comprise a payments system 425 as illustrated here. In such a case, a request for authorization of the transaction can be sent from the payment system to a financial institution maintaining the financial account. For example, the financial account can comprise a credit account and the financial institution can comprise the issuer of the credit account. In another example, the financial account can comprise a debit account and the financial institution comprises the holder of the debit account. In yet another example, the financial account comprises a demand deposit account and the financial institution comprises the holder of the demand deposit account. An indication of authorization, e.g., an approval message 1610, electronic receipt, or other message, can be received at the payment system 425 from the financial institution 316. The indication of whether the transaction is authorized can be sent from the payment system 425 to the first acquirer system, e.g., the gateway 415 based on the indication of authorization from the financial institution 316. In other cases, the financial account can comprise a stored value account and the second acquirer system can comprise a system maintaining information related to the stored value account such as prepaid system 430. In such a case, a request for authorization of the transaction can be sent to the prepaid system 430 and an authorization or denial can be provided by the prepaid system 430 in reply. The request and reply can be communicated through the mobile commerce gateway 415 or between the payments system 425 and prepaid system 430 without passing through the gateway 415. Additionally or alternatively, the financial account can comprise a loyalty account and the second acquirer system can comprise a system maintaining information related to the loyalty account.

Figure 17:
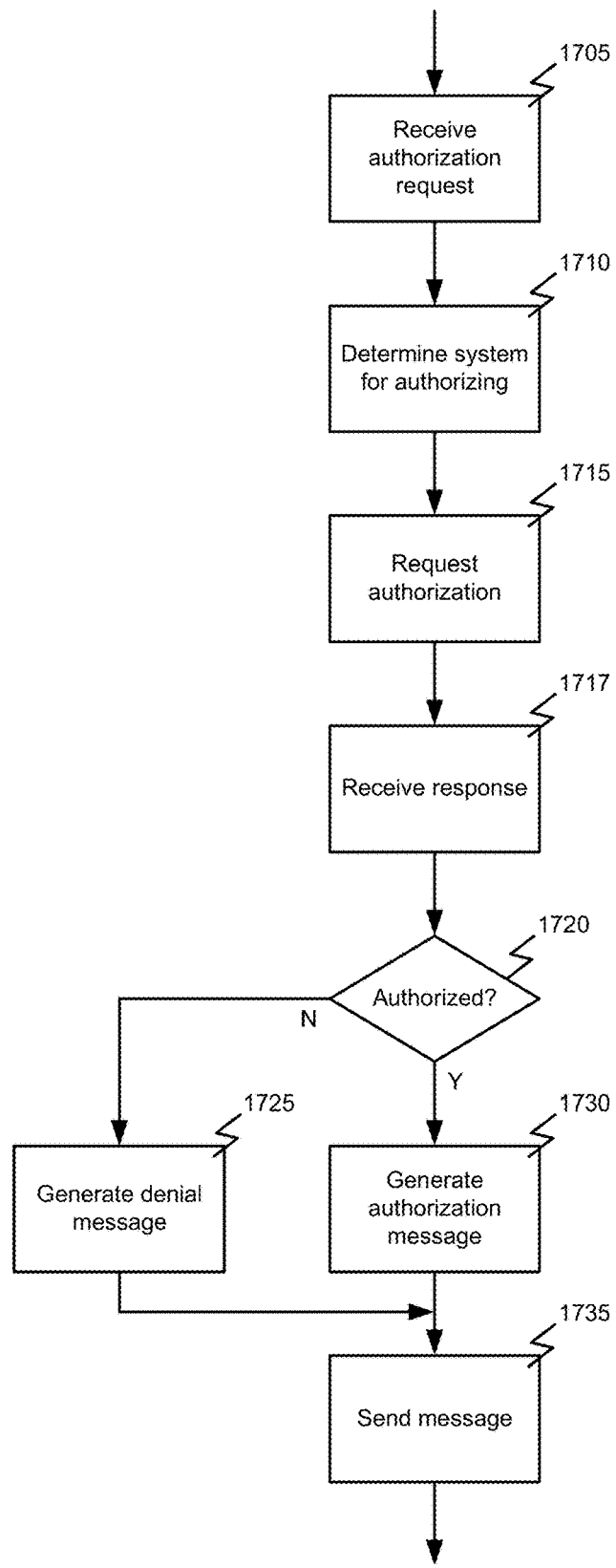
FIG. 17 is a flowchart illustrating a process for handling payment transactions according to one embodiment of the present invention.

FIG. 17 is a flowchart illustrating a process for handling payments according to one embodiment of the present invention. In this example, the process begins with receiving 1705 at a first acquirer system a communication, i.e., an authorization request, from a point-of-sale (POS) device. The communication can be related to the payment transaction and can include information identifying a financial account from which a payment is requested. A second acquirer for authorizing the payment can be identified 1710 based on the information identifying the financial account. The communication can be sent 1715 to the second acquirer system for authorization of the transaction based on the information related to the financial account. An indication of whether the transaction is authorized can be received 1717 from the second acquirer system. In response to an indication that the transaction is authorized 1720, an authorization message can be generated 1730 and sent 1735 to the POS device. In response to an indication that the transaction is not authorized 1720, a denial message can be generated 1725 and sent 1735 to the POS device.

Figure 18:
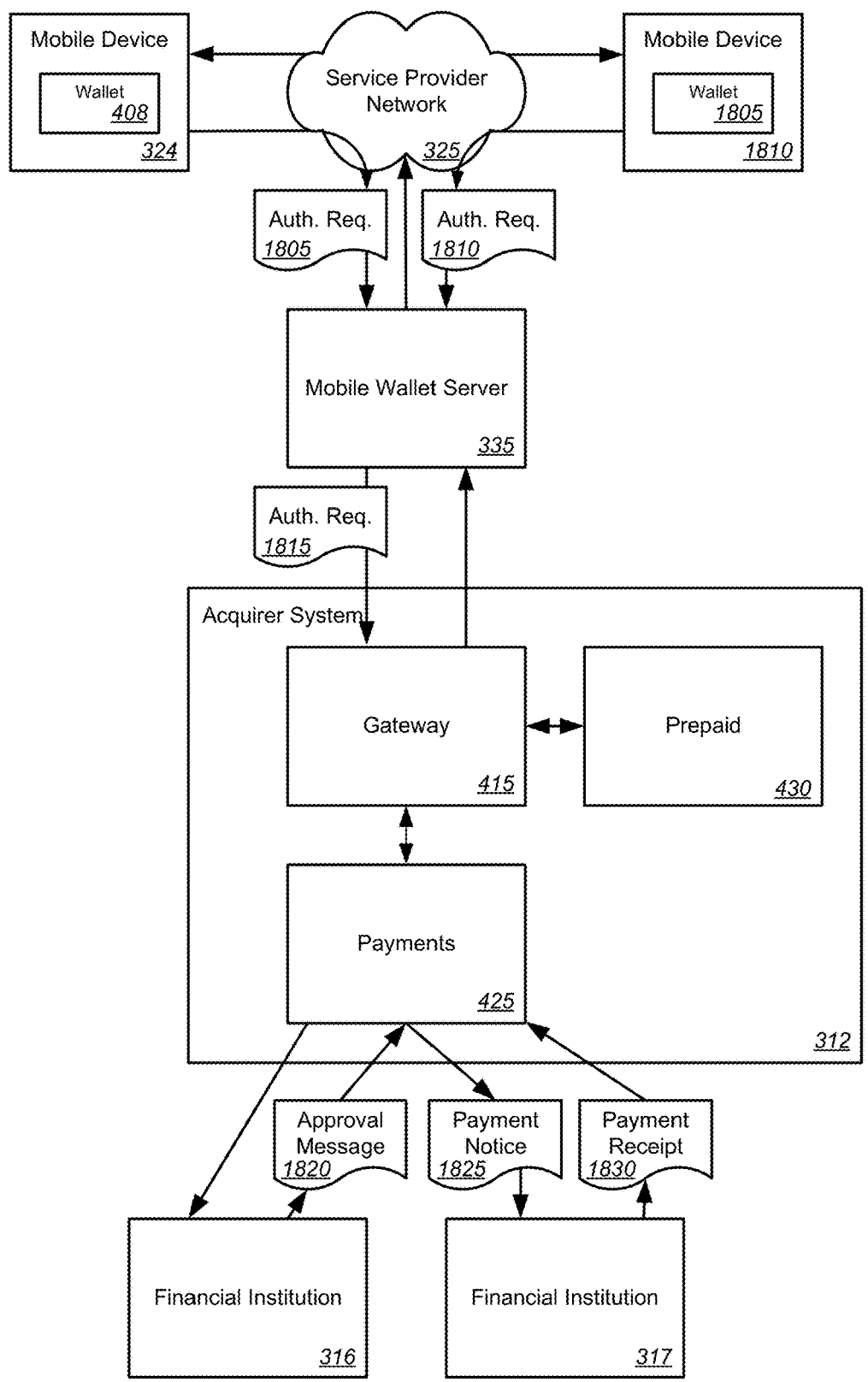
FIG. 18 is a block diagram illustrating elements of a mobile commerce system for handling payments or transfers between mobile devices according to one embodiment of the present invention.

FIG. 18 is a block diagram illustrating elements of a mobile commerce system for handling payments or transfers between mobile devices according to one embodiment of the present invention. As illustrated here, a system can comprise a wireless communications network 325 and a first mobile device 324 communicatively coupled with the wireless communications network 325. The first mobile device 324 can be adapted to execute a mobile wallet application 408, wherein the mobile wallet application 408 can be adapted to maintain at least one set of information related to a first financial account. The system can also include a second mobile device 1810 communicatively coupled with the wireless communications network 325. The second mobile device 1810 can be adapted to execute a mobile wallet application 1805, wherein the mobile wallet application 1805 of the second device 1810 can be adapted to maintain at least one set of information related to a second financial account.

According to one embodiment, the user of the first mobile device 324 may initiate a payment to the user of the second mobile device 1810. For example, a user of one mobile device can transfer value, e.g., money, credit, gift card value, etc., or other items such as advertising or marketing offers to another mobile device or user by selecting a "pay mobile wallet" or other option via his mobile wallet interface. Upon initiation, the user of the first mobile device 324 can select an account for which information is stored in the mobile wallet 408 of the first mobile device 324 from which payment will be made. Similarly, the user of the second mobile device 1810 can select an account for which information is stored in the mobile wallet 1805 of the second mobile device 1810 to which payment will be made.

In some cases, the mobile wallet 408 or 1805 of one or both devices 324 and 1810 may also assign a transaction number or some other identifying information to the transaction. That is, in order to identify communications related to the transfer, information identifying the transfer can be assigned by the mobile wallet of one or both devices. In some cases, the information may include the account numbers for the transaction. For example, the parties may "beam" via RF, IR, NFC, or other communications means, to the other device the account number selected. In other cases, to in order to avoid sharing account numbers between the devices, other identifying information may be used. For example, the mobile wallet may be associated with a device number, phone number or other number or information identifying the device on which it is installed. Thus, a payor may designate a device to which the transaction is targeted. In still other cases, the originating device, target device, or both in combination may generate a unique identifier for the transaction. Regardless of how the identifier is generated, the identifying information can be included in communications to and from the devices 324 and 1810 and between other elements of the system to correlate the communications to the transaction or transfer.

One or both of the mobile devices 324 and 1810 can then send an authorization request 1805 and 1810 via the service provider network to the mobile wallet server 335 and/or the acquirer system 312. According to one embodiment, the requests 1805 and 1810 may include identity credentials or other information for authenticating or otherwise verifying the users and/or devices by any or all of the elements of the system. Additionally or alternatively, the requests 1805 and 1810 can include information identifying the transaction and/or one or both account numbers involved in the transaction.

A first acquirer system, e.g., the gateway 415, can be communicatively coupled with the wireless communications network 325 either directly or via the mobile wallet server 335. The first acquirer system 415 can be adapted to receive a communication from the first mobile device 1805, i.e., the authorization request. The authorization request 1805 from the first mobile device 324 can include information identifying the first financial account from which the payment is requested. A second acquirer system such as a payment system 425 can be communicatively coupled with the first acquirer system 415. The first acquirer system 415 can be further adapted to identify the second acquirer system 425 based on the information identifying the first financial account, send the communication to the second acquirer system 425 for authorization of the transaction based on the information related to the first financial account.

The second acquirer system can, for example, send the authorization request 1815 to a first financial institution 316, i.e., the financial institution issuing or holding the first financial account, for authorization and receive an indication 1820 of whether the transaction is authorized. The second acquirer system 425 can send the indication 1820 of whether the transaction is authorized to the first acquirer system 415 to be returned, for example via the gateway 415 and/or mobile wallet server 335 to the first mobile device 324 and the second mobile device 1810.

As noted above, the first acquirer system 415 can receive from the second mobile device 1810 a communication 1810 identifying a second financial account to which the payment is directed. In such cases, the second acquirer system 425 can be adapted to generate a payment notification message 1825 identify a system 317 maintaining the second financial account based on the communication 1810 identifying the second financial account and send the payment notification message 1825 to the system 317 maintaining the second financial account in response to receiving an indication that the transaction is authorized. The payment notification message may be used to initiate and/or authorize, for example in combination with the approval message 1820 from the first financial institution, a transaction between the first financial institution and the second financial institution to complete the payment. In reply, the second acquirer system 425 may receive a message 1830 indicating receipt of the payment. The second payment system 425 may then forward the receipt message 1830 to the second mobile device 1810, for example via the gateway 415 and/or the mobile wallet server 335.

It should be understood that the first financial account can comprise a credit account and the first financial institution can comprise the issuer of the credit account. In another cases, the first financial account can comprise a debit account and the financial institution can comprise the holder of the debit account. In another example, the first financial account can comprise a demand deposit account and the financial institution can comprise the holder of the demand deposit account. In still another example, the first financial account can comprise a loyalty account and the second acquirer system can comprise a system maintaining information related to the loyalty account.

In yet another example, either or both of the financial accounts can comprise a stored value account and the acquirer systems 312 can include a system maintaining information related to the stored value account such as prepaid system 430. In such a case, a request for authorization of the transaction can be sent to the prepaid system 430 and an authorization or denial can be provided by the prepaid system 430 in reply. The request and reply can be communicated through the mobile commerce gateway 415 or between the payments system 425 and prepaid system 430 without passing through the gateway 415. In other words, rather than transferring payments to or from a credit account, debit account, demand deposit account, etc., a transfer to or from a prepaid or stored value account, such as a gift card or other stored value account, can be performed. For example, a user initiating a transaction may choose to transfer a gift card from his mobile wallet to the mobile wallet of the recipient or payee. In another example, an initiating user may elect to add value to or "top-up" a card already in the recipient or payor's wallet. In yet another example, the initiating user may choose to pay the recipient in the form of a new gift card or stored value account, i.e., add a new card to the payee's mobile wallet.

In such cases, the transaction can proceed in a manner similar to that described above. For example, when making a transfer from a credit, debit, demand deposit, or other type of account to a prepaid account, the first acquirer system, e.g., the gateway 415, can be adapted to receive a communication from the first mobile device 324, i.e., the authorization request 1805. The authorization request 1805 from the first mobile device 324 can include information identifying the first financial account from which the payment is requested. The gateway 415 can be further adapted to identify the second acquirer system e.g., the payments system 425, based on the information identifying the first financial account. As noted above, the second acquirer system can, for example, send the authorization request 1815 to a first financial institution 316, i.e., the financial institution issuing or holding the first financial account, for authorization and receive an indication 1820 of whether the transaction is authorized. The second acquirer system 425 can send the indication 1820 of whether the transaction is authorized to the gateway 415 to be provided to the prepaid system 430. The prepaid system 430, upon receiving from the gateway 415 an authorization request identifying a target account, user, device, etc. and an approval message, can credit the identified or new prepaid account, generate a payment receipt, and send the receipt to the gateway 415 to be returned to one or both of the mobile devices 324 and 1810.

In another example, when making a transfer from a prepaid account to another type of account, the gateway 415 can be adapted to receive a communication from the first mobile device 324, i.e., the authorization request 1805. The authorization request 1805 from the first mobile device 324 can include information identifying the first financial account from which the payment is requested. The gateway 415 can be further adapted to identify the second acquirer system e.g., the prepaid system 430, based on the information identifying the first financial account. The prepaid system 430 can then authorize the payment, or not, and send an indication of whether the transaction is authorized, e.g., a payment notice 1825 to the gateway 415 to be provided to the payments system 425. The payments system 425, upon receiving from the gateway 415 an payment notice 1825 identifying a target account, user, device, etc. and an approval message, can credit the identified account, generate a payment receipt 1830, and send the receipt to the gateway 415 to be returned to one or both of the mobile devices 324 and 1810.

In yet another example, when making payments or transfers between prepaid accounts, the gateway 415 can be adapted to receive a communication from the first mobile device 324, i.e., the authorization request 1805. The authorization request 1805 from the first mobile device 324 can include information identifying the first financial account from which the payment is requested. The gateway 415 can be further adapted to identify the second acquirer system e.g., the prepaid system 430, based on the information identifying the first financial account. The prepaid system 430 can then authorize the payment, credit the identified target account, and send an indication of completion or denial of the transaction, e.g., a payment receipt, and send the receipt to the gateway 415 to be returned to one or both of the mobile devices 324 and 1810.

Figure 19:
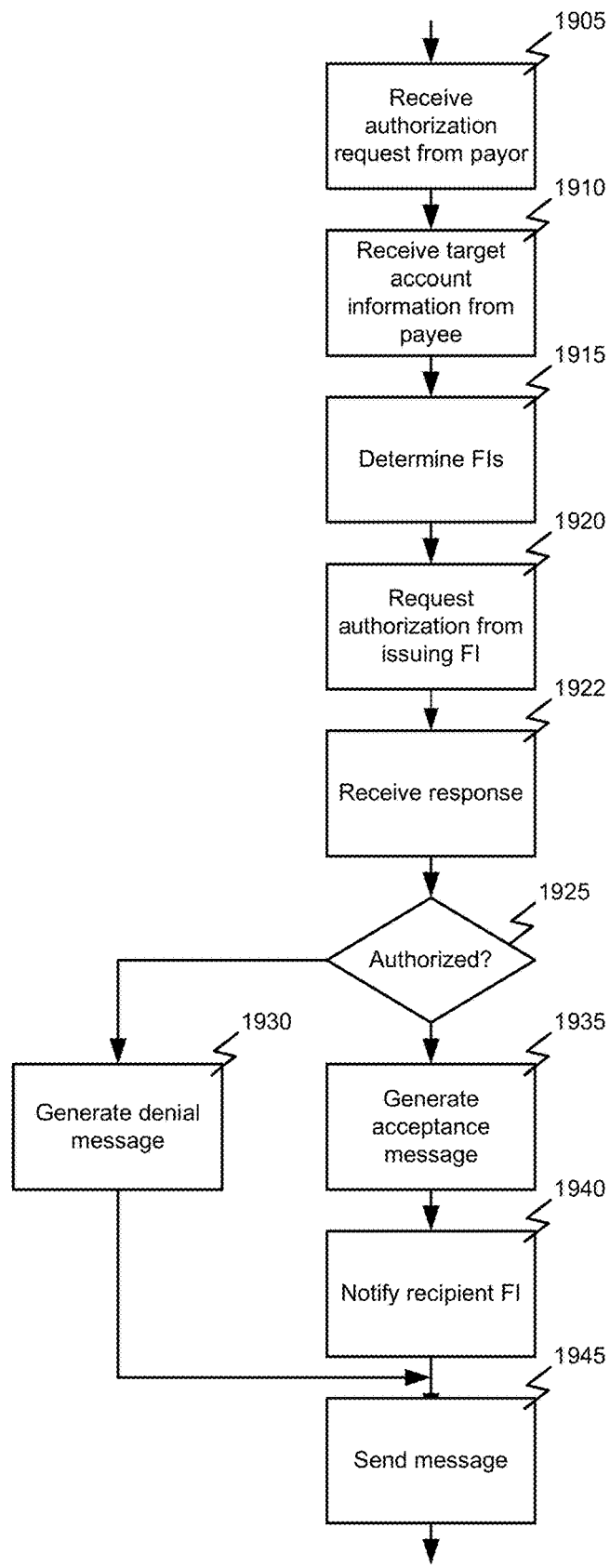
FIG. 19 is a flowchart illustrating a process for handling payments or transfers between mobile devices according to one embodiment of the present invention.

FIG. 19 is a flowchart illustrating a process for handling payments or transfers between mobile devices according to one embodiment of the present invention. In this example, the process begins with receiving 1905 at a first acquirer system a communication from the first mobile device. The communication can be related to the payment transaction and can include information identifying a first financial account from which a payment is requested. In some cases, a communication can be received 1910 from the second mobile device that identifies a second financial account to which the payment is directed. A second acquirer system for authorizing the payment can be identified 1915 based on the information identifying the first financial account. The communication can be sent 1920 to the second acquirer system for authorization of the transaction based on the information related to the first financial account.

An indication of whether the transaction is authorized can be received 1922 at the second acquirer system. In response to receiving an indication that the transaction is authorized 1925, a payment authorization message can be generated 1935. In some cases, a system maintaining the second financial account can be identified based on the communication identifying the second financial account and a payment notification message can be generated 1940. The payment authorization message and/or the notification message, if any, can be sent 1945 to the system maintaining the second financial account, the first mobile device, and/or the second mobile device. Settlement, i.e., the transfer of funds between the accounts involved, can then be performed in the conventional manner. In response to receiving from the second acquirer system an indication that the transaction is not authorized 1925, a denial message can be generated 1930 and sent 1945 to the first mobile device and/or the second mobile device.

In the foregoing description, for the purposes of illustration, methods were described in a particular order. It should be appreciated that in alternate embodiments, the methods may be performed in a different order than that described. Additionally, the methods may contain additional or fewer steps than described above. It should also be appreciated that the methods described above may be performed by hardware components or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A point of sale device, comprising:
a network interface;
an antenna for transmitting and receiving electromagnetic signals;
at least one processor; and
a memory having instructions stored thereon that, when executed by the at least one processor cause the at least one processor to:
receive, from a mobile device of a customer and using the antenna, one or more electromagnetic signals;
interpret the one or more electromagnetic signals to determine information related to a financial account of the customer;
initiate a connection to an acquirer system using the network interface;
transmit a packet of data comprising an authorization request over the connection to the acquirer system, the authorization request comprising the information related to the financial account, a merchant identifier, a date, and a transaction amount;
receive, responsive to transmitting the authorization request and using the connection, an authorization code from the acquirer system, the authorization code indicating that the authorization request has been approved;
receive, responsive to the transmitting the authorization request and using the connection, an electronic receipt from the acquirer system;
modify the electronic receipt to generate a modified electronic receipt including transaction-specific information and encrypted information supplied by a merchant associated with the point of sale device, the encrypted information comprising information that is usable to verify one or more of an origin of the electronic receipt, contents of the electronic receipt, and an authenticity of the electronic receipt; and
transmit the modified electronic receipt to the mobile device.

2. The point of sale device of claim 1, wherein:
the one or more electromagnetic signals further comprise an identifier of the mobile device; and
the modified electronic receipt is routed to the mobile device using the identifier of the mobile device.

3. The point of sale device of claim 2, wherein:
the identifier of the mobile device comprises a phone number associated with the mobile device.

4. The point of sale device of claim 1, wherein:
the authorization request further comprises one or both of an identifier of the customer and an identifier of the mobile device.

5. The point of sale device of claim 1, wherein the instructions further cause the at least one processor to:

generate one or more outgoing electromagnetic signals to transmit the modified electronic receipt, wherein transmitting the modified electronic receipt comprises transmitting, using the antenna, the one or more outgoing electromagnetic signals.

6. The point of sale device of claim 1, wherein:
the antenna operates using a near field communication (NFC) protocol.

7. A computer-implemented method of conducting wireless transaction, comprising:
receiving, by a point of sale device from a mobile device of a consumer using an antenna, one or more electromagnetic signals;
interpreting, by the point of sale device, the one or more electromagnetic signals to determine information related to a financial account of the consumer;
initiating, by the point of sale device using a network interface, a connection with an acquirer system;
transmitting, by the point of sale device using the network interface, a packet of data comprising an authorization request over the connection to the acquirer system, the authorization request comprising the information related to the financial account, a merchant identifier, a date, and a transaction amount;
receiving, by the point of sale device, responsive to transmitting the authorization request and over the connection, an authorization code from the acquirer system, the authorization code indicating that the authorization request has been approved;
receiving, by the point of sale device, responsive to the transmitting the authorization request and using the connection, an electronic receipt from the acquirer system;
modifying, by the point of sale device, the electronic receipt to generate a modified electronic receipt including transaction-specific information and encrypted information supplied by a merchant associated with the point of sale device, the encrypted information comprising information that is usable to verify one or more of an origin of the electronic receipt, contents of the electronic receipt, and an authenticity of the electronic receipt; and
transmitting, by the point of sale device using one of the antenna or the network interface, the modified electronic receipt to the mobile device.

8. The computer-implemented method of conducting wireless transaction of claim 7, wherein:
the one or more electromagnetic signals further comprise an identifier of the mobile device; and
the modified electronic receipt is routed to the mobile device using the identifier of the mobile device.

9. The computer-implemented method of conducting wireless transaction of claim 7, further comprising:
generating, by the point of sale device, one or more outgoing electromagnetic signals to transmit the modified electronic receipt, wherein transmitting the modified electronic receipt comprises transmitting, using the antenna, the one or more outgoing electromagnetic signals.

10. The computer-implemented method of conducting wireless transaction of claim 7, wherein:
the antenna operates using a near field communication (NFC) protocol.

11. A non-transitory computer-readable medium having instructions stored thereon that, when executed by one or more processors of a point of sale device cause the point of sale device to:
receive, from a mobile device of a consumer using an antenna, one or more electromagnetic signals;
interpret the electromagnetic signals to determine information related to a financial account of the consumer;
initiate, using a network interface of the point of sale device, a connection with an acquirer system;
transmit, using the network interface a packet of data comprising an authorization request over the connection to the acquirer system, the authorization request comprising the information related to the financial account, a merchant identifier, a date, and a transaction amount;
receive, responsive to transmitting the authorization request and using the connection, an authorization code from the acquirer system, the authorization code indicating that the authorization request has been approved;
receive, responsive to transmitting the authorization request and using the connection, an electronic receipt from the acquirer system;
modify the electronic receipt to generate a modified electronic receipt including transaction-specific information and encrypted information supplied by a merchant associated with the point of sale device, the encrypted information comprising information that is usable to verify one or more of an origin of the electronic receipt, contents of the electronic receipt, and an authenticity of the electronic receipt; and
transmit the modified electronic receipt to the mobile device.

12. The non-transitory computer-readable medium of claim 11, wherein:
the one or more electromagnetic signals further comprise an identifier of the mobile device; and
the modified electronic receipt is routed to the mobile device using the identifier of the mobile device.

13. The non-transitory computer-readable medium of claim 11, wherein the instructions, when executed by the one or more processors, further cause the point of sale device to:
generate one or more outgoing electromagnetic signals to transmit the modified electronic receipt, wherein transmitting the modified electronic receipt comprises transmitting, using the antenna, the one or more outgoing electromagnetic signals.

14. The non-transitory computer-readable medium of claim 11, wherein:
the antenna operates using a near field communication (NFC) protocol.

* * * * *